No. 887,224.                                                    PATENTED MAY 12, 1908.
W. J. PINE.
MACHINE FOR COILING AND WEAVING WIRE.
APPLICATION FILED SEPT. 21, 1905.
13 SHEETS—SHEET 6.
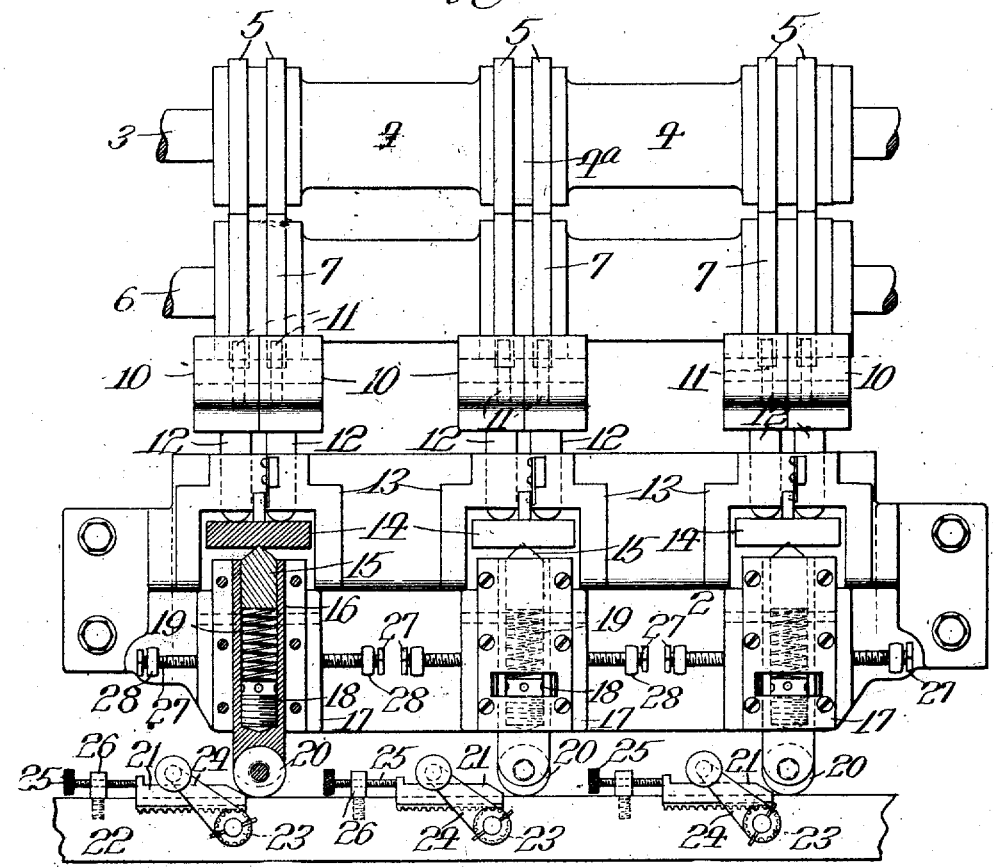
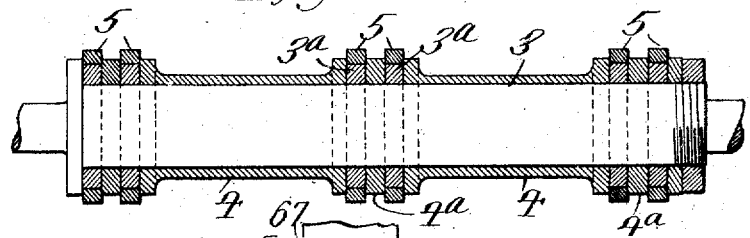
Witnesses                                                       Inventor
                                                                Wilber J. Pine
                                                                By Rector & Nibben
                                                                    his Attys

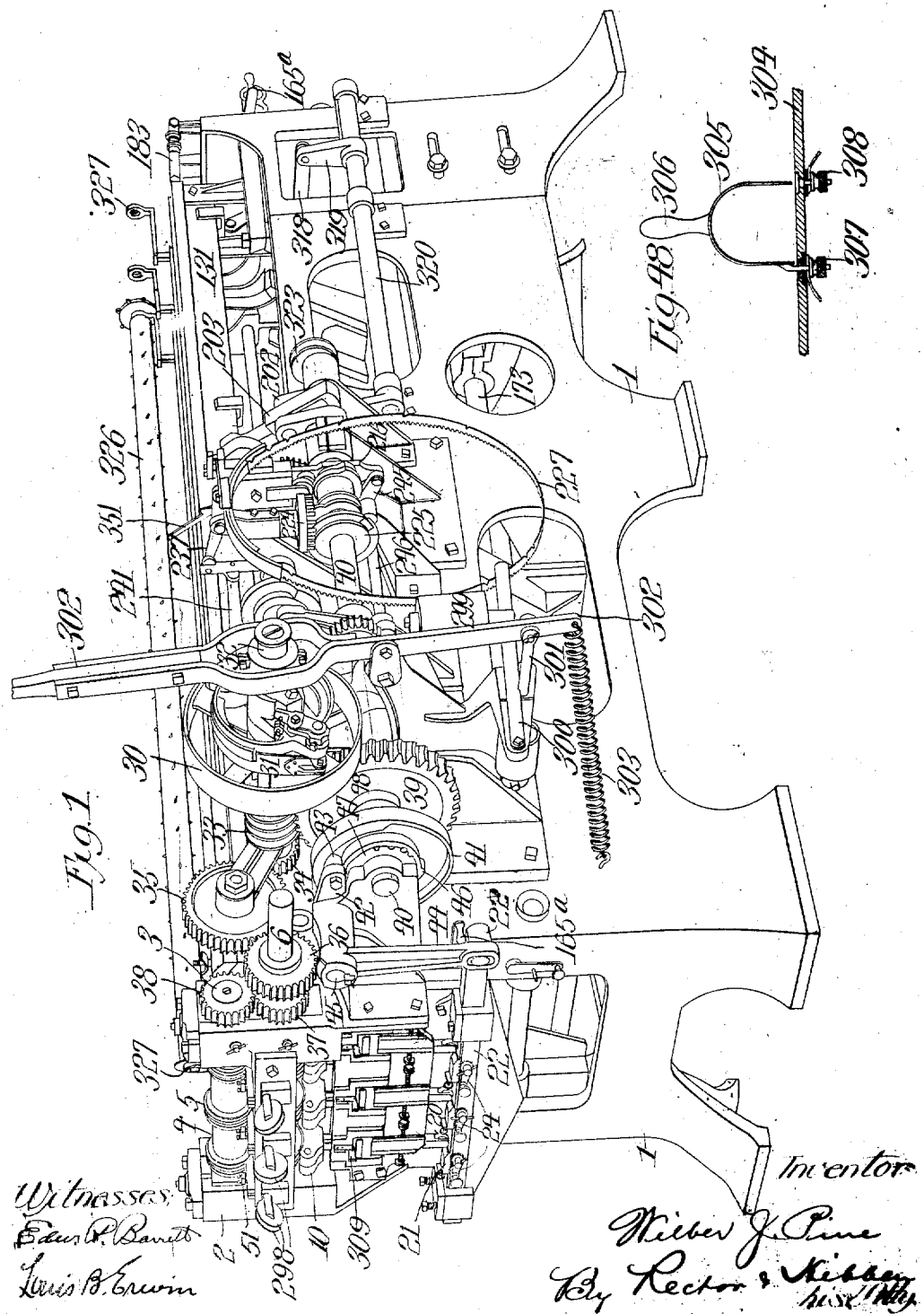

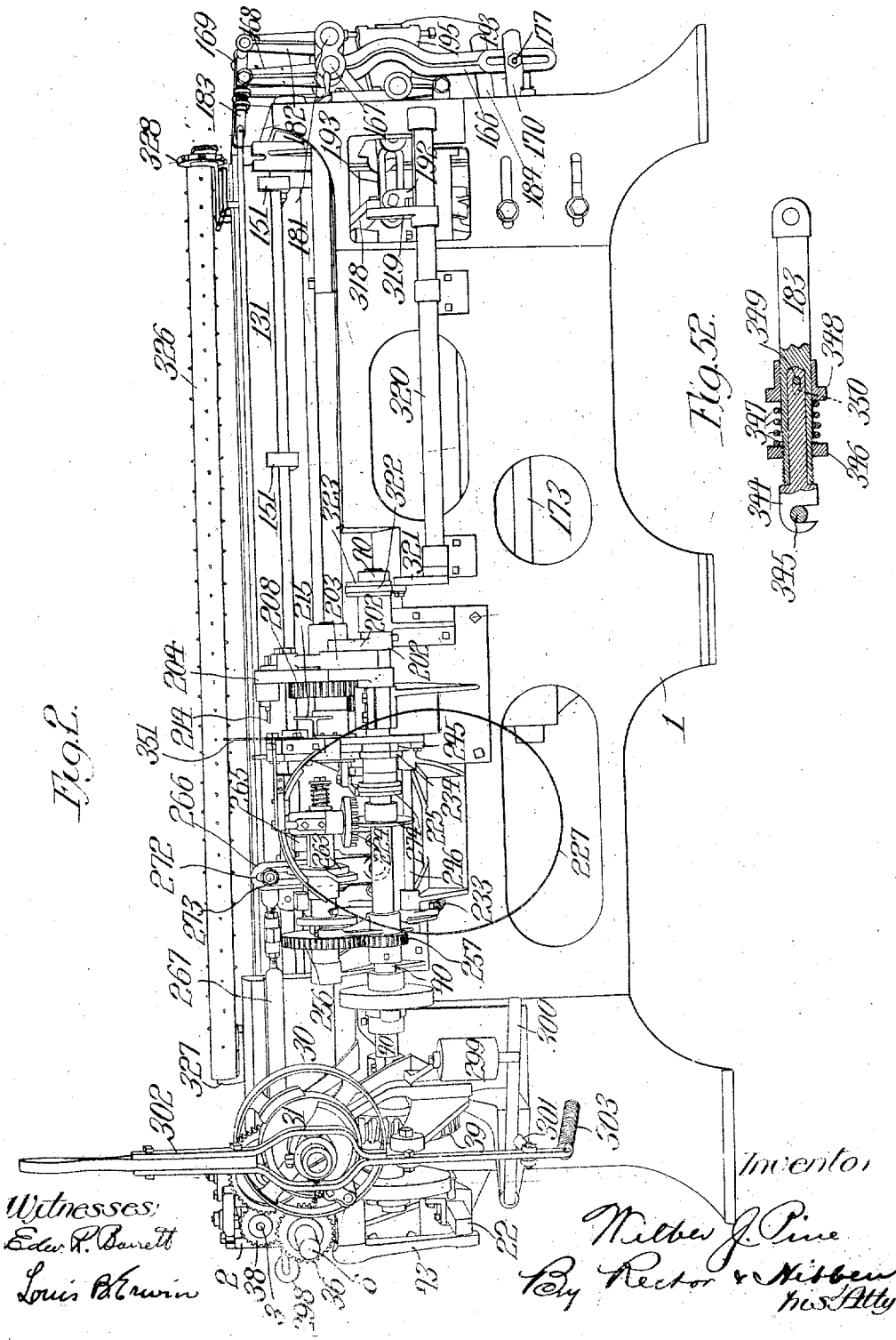

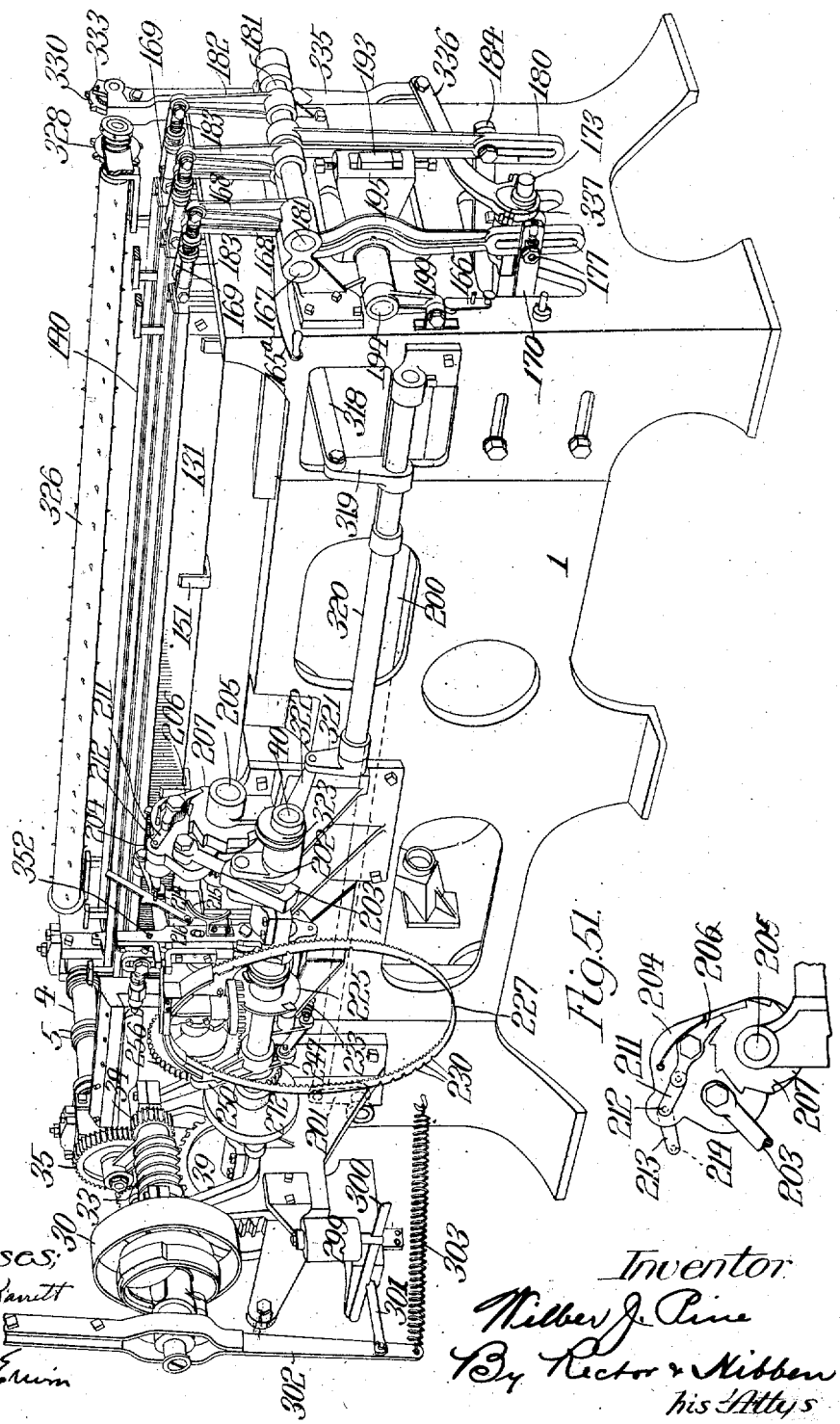

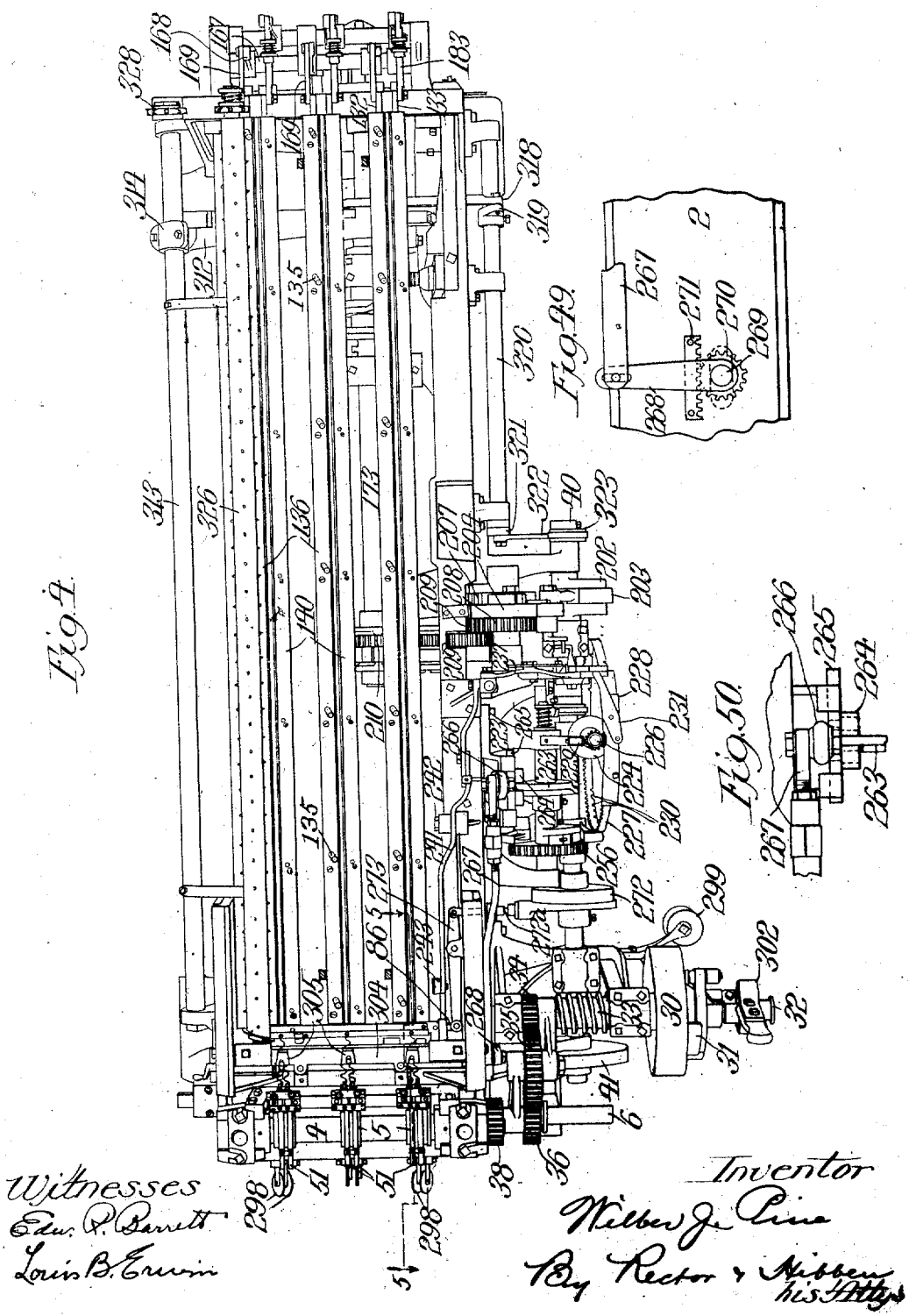

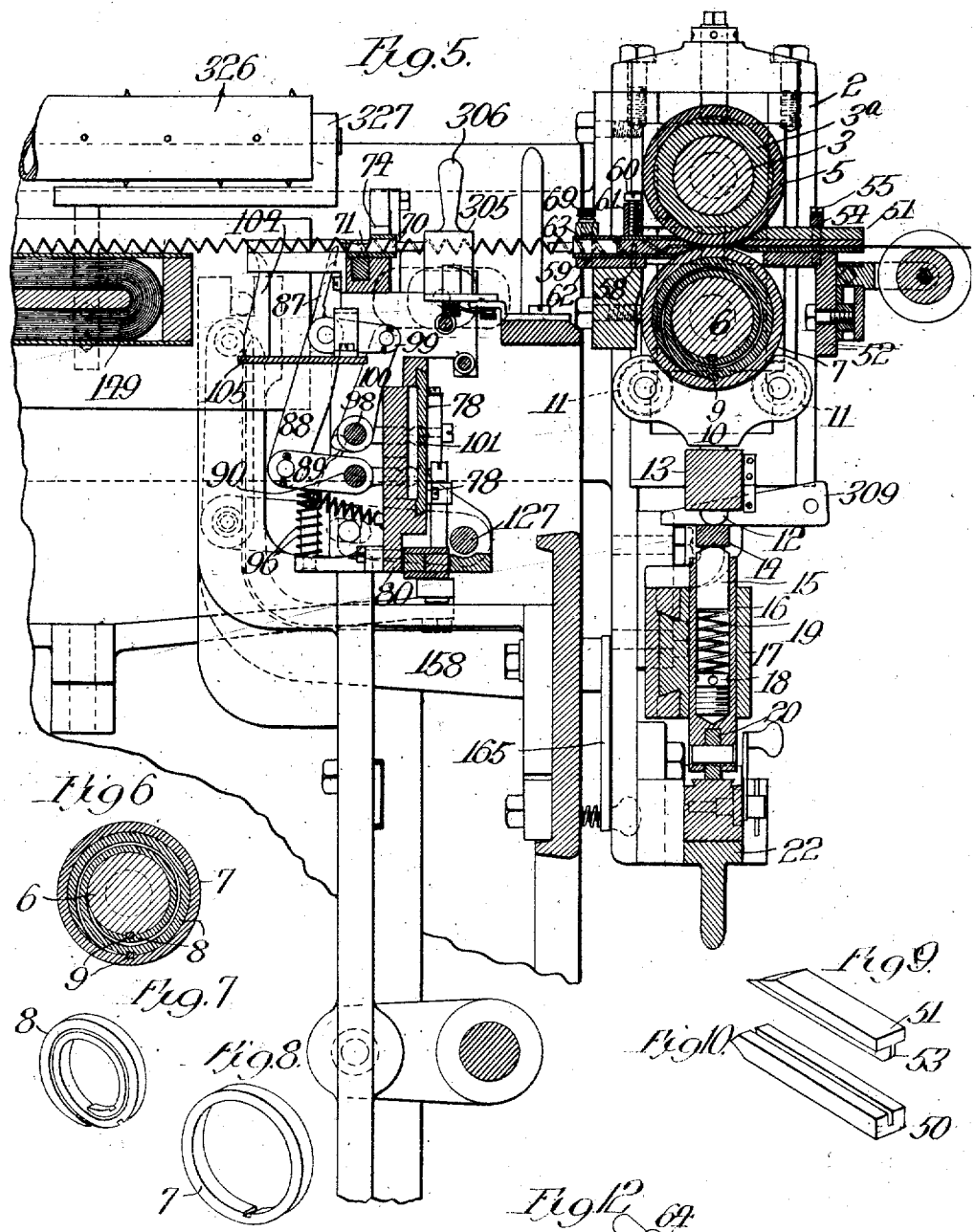

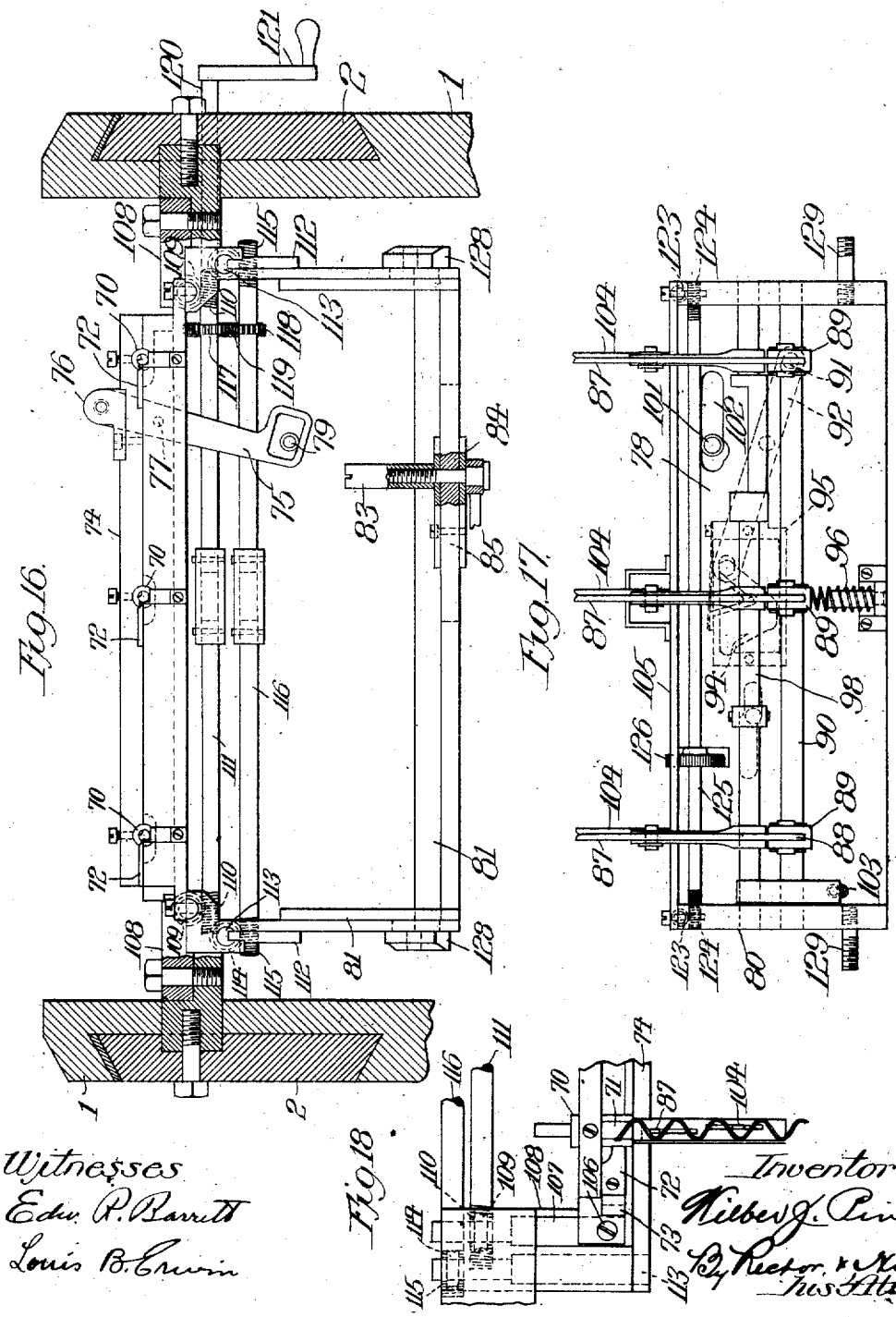

No. 887,224. PATENTED MAY 12, 1908.
W. J. PINE.
MACHINE FOR COILING AND WEAVING WIRE.
APPLICATION FILED SEPT. 21, 1905.
13 SHEETS—SHEET 8.
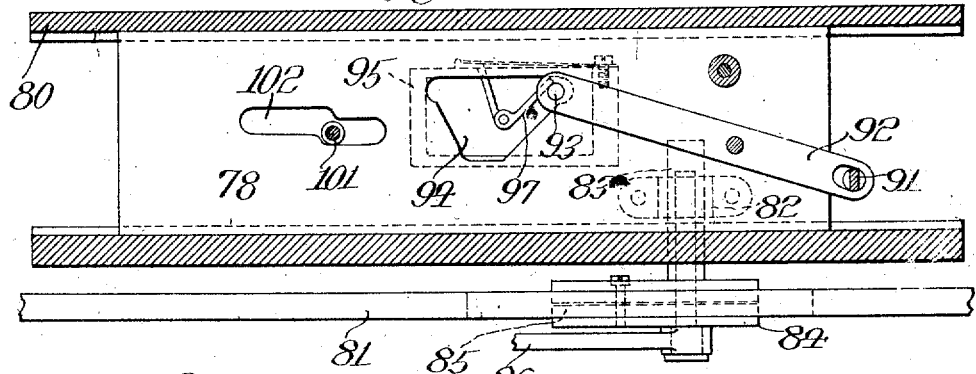
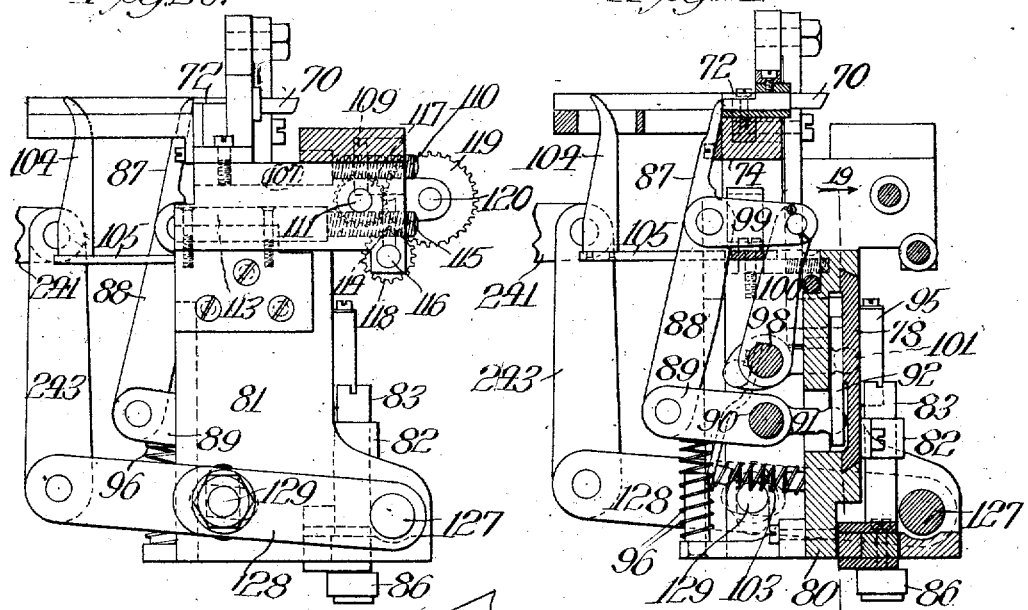
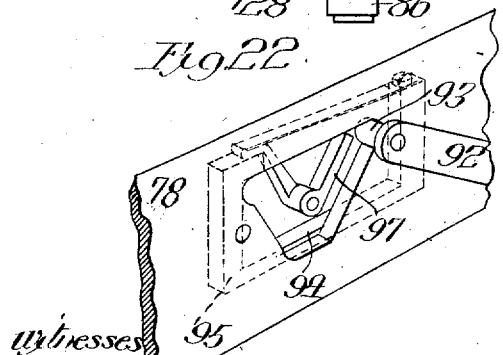
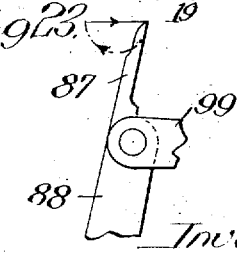
Witnesses
Edw. P. Barrett
Louis B. Erwin
Inventor
Wilbur J. Pine
By Rector & Killeen
his Attys

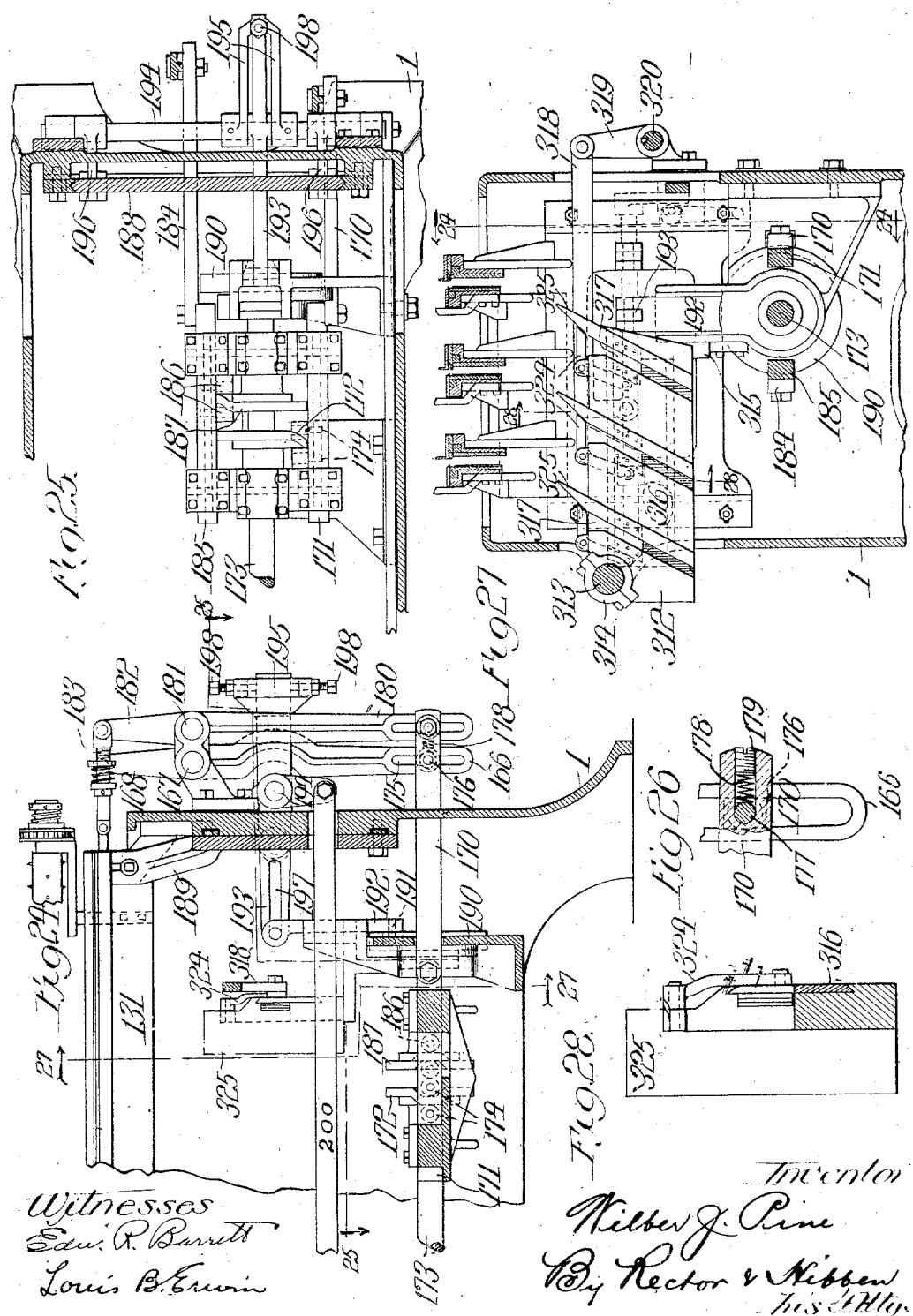

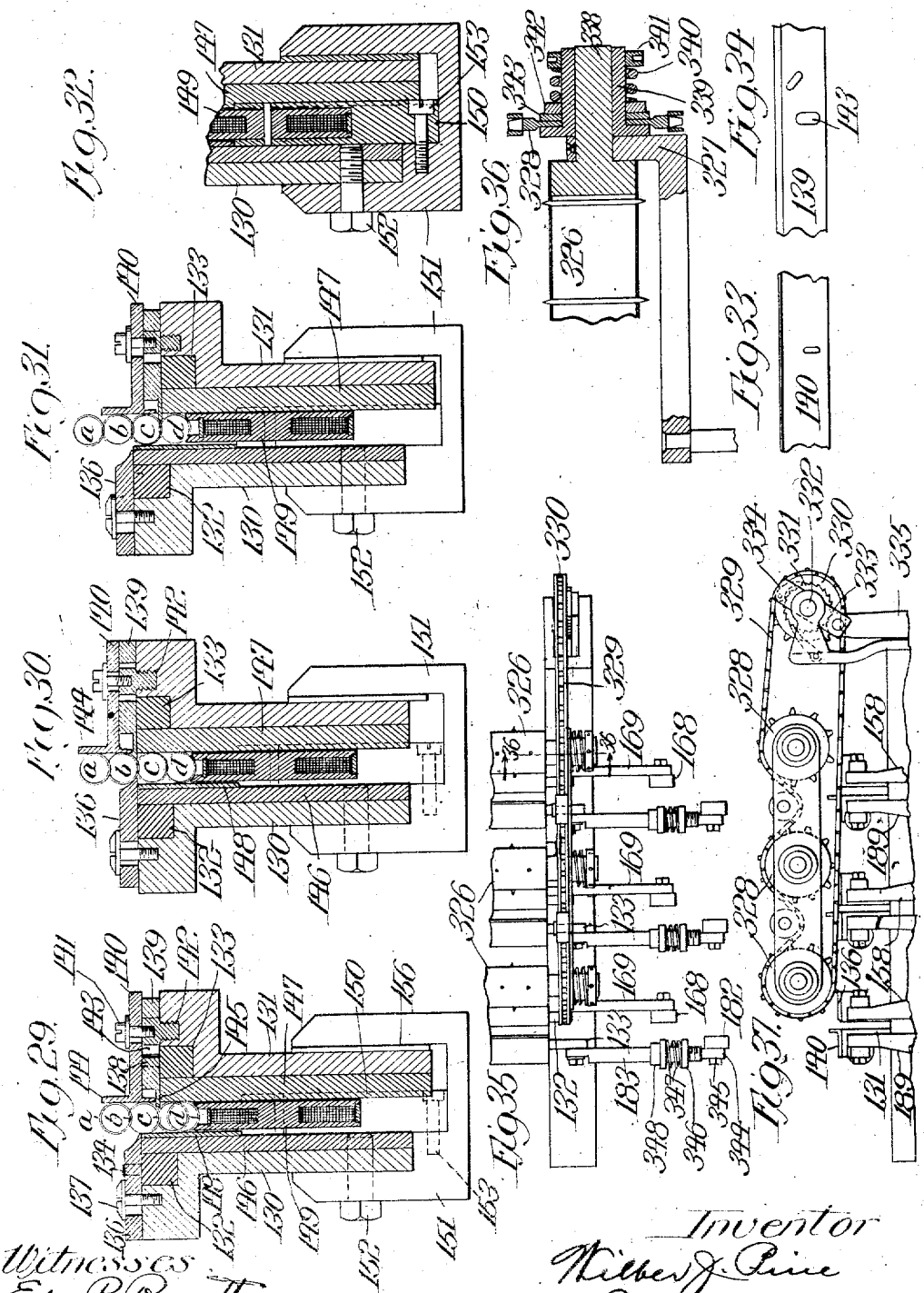

No. 887,224. PATENTED MAY 12, 1908.
W. J. PINE.
MACHINE FOR COILING AND WEAVING WIRE.
APPLICATION FILED SEPT. 21, 1905.
13 SHEETS—SHEET 11.
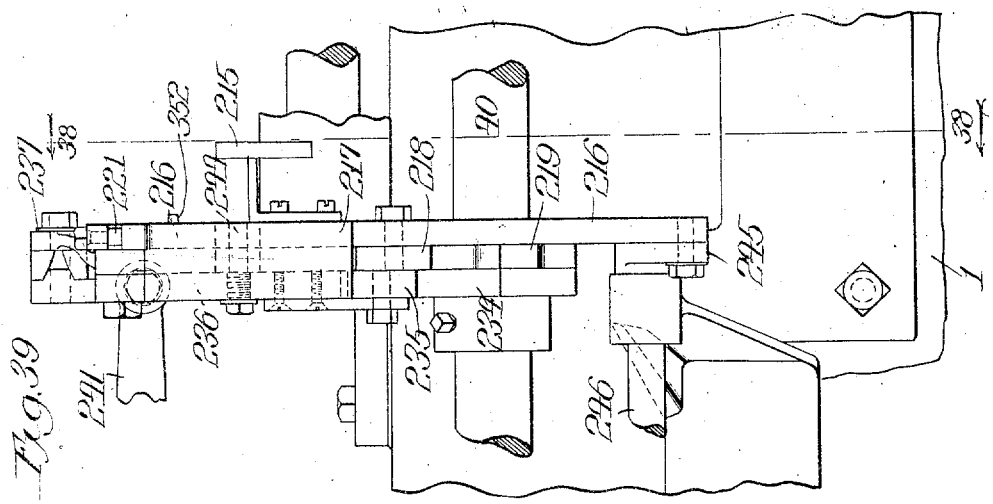
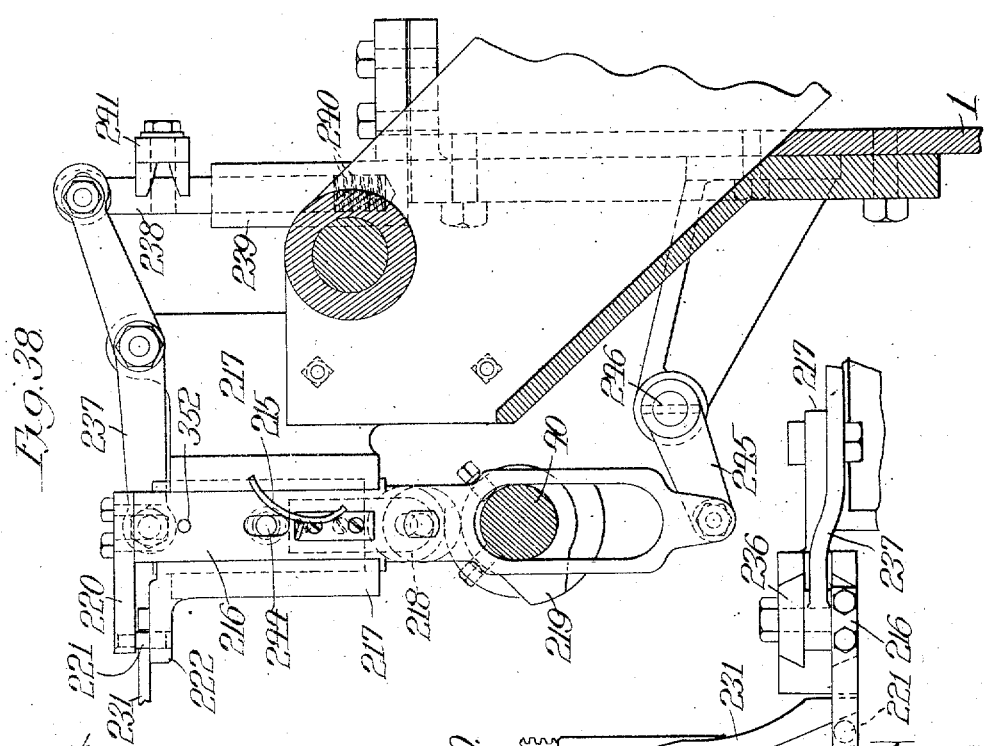
Witnesses
Edw. R. Barrett
Louis B. Erwin
Inventor
Wilber J. Pine
By Rector & Hibben
his Attys No. 887,224. PATENTED MAY 12, 1908.
W. J. PINE.
MACHINE FOR COILING AND WEAVING WIRE.
APPLICATION FILED SEPT. 21, 1905.
13 SHEETS—SHEET 12.
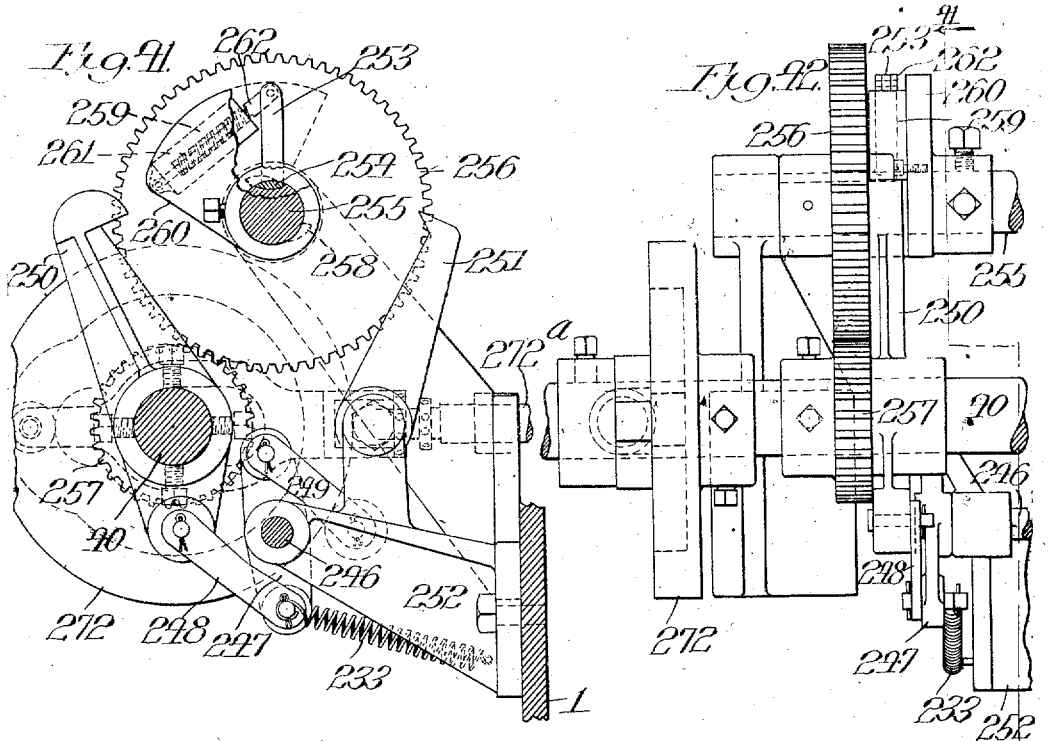
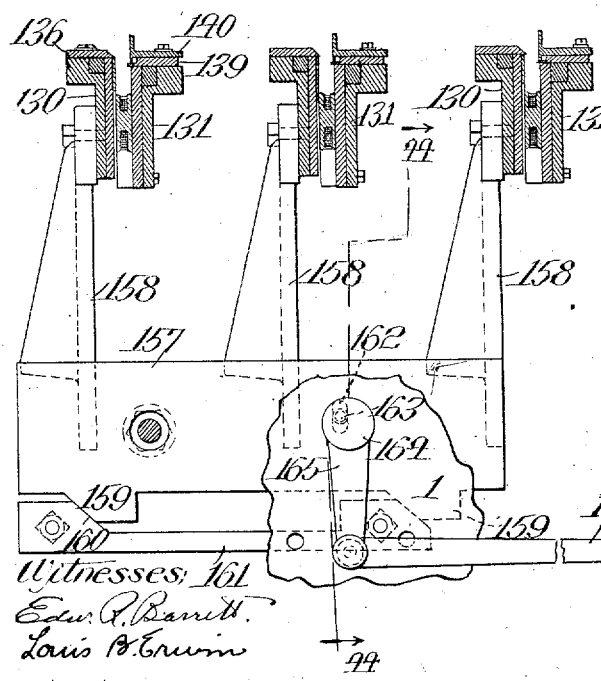
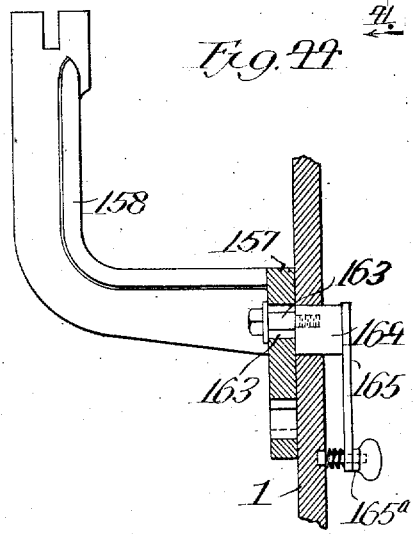
Witnesses:
Edw. P. Barritt.
Louis B. Erwin.
Inventor
Wilber J. Pine
By Rector & Hibben
his Attys.

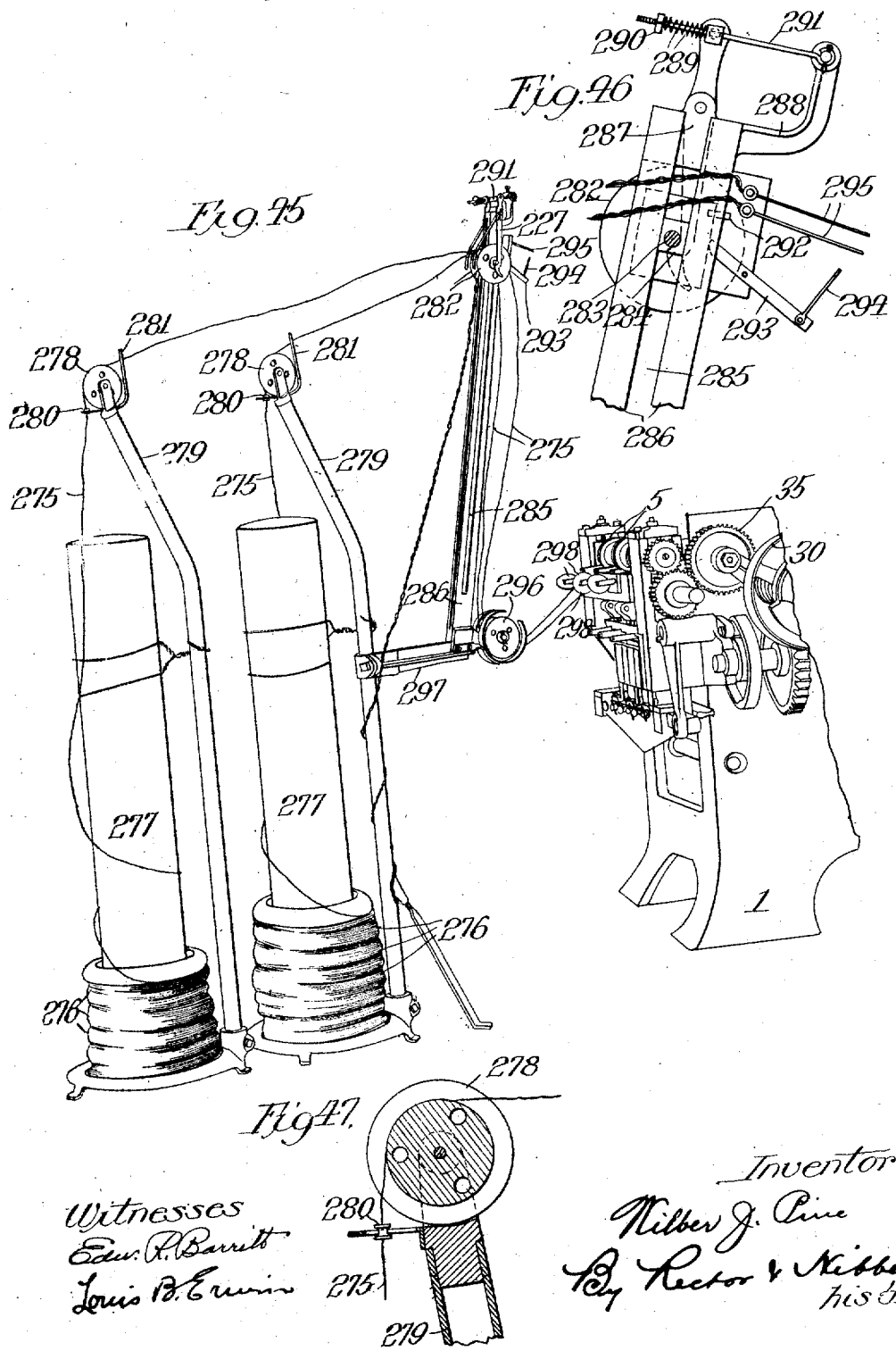

UNITED STATES PATENT OFFICE.

WILBER J. PINE, OF OSHKOSH, WISCONSIN, ASSIGNOR TO PINE-IHRIG MACHINE COMPANY, OF OSHKOSH, WISCONSIN, A CORPORATION OF WISCONSIN.

MACHINE FOR COILING AND WEAVING WIRE.

No. 887,224.

Specification of Letters Patent.

Patented May 12, 1908.

Application filed September 21, 1905. Serial No. 279,438.

*To all whom it may concern:*

Be it known that I, WILBER J. PINE, a citizen of the United States, residing at Oshkosh, in the county of Winnebago and State of Wisconsin, have invented certain new and useful Improvements in Machines for Coiling and Weaving Wire Into a Fabric, of which the following is a specification.

My invention relates to machines for coiling and weaving wire into a fabric, such as are employed, for instance, in the manufacture of wire mattresses, although, as will be understood, the fabric produced by my machine may be employed for various other purposes.

The object of my invention is to produce a novel, efficient and reliable machine of this character operating in an automatic manner, beginning with the taking of the wire from the reel and ending with the production of the complete wire fabric. The machine is, moreover, provided with various adjustments whereby the length of the fabric may be regulated and whereby the diameter and pitch of coil may be adjusted as required for different characters of fabric and also for different styles or types of fabric of the same character or class. Moreover, the construction of my mechanism is such that a single fabric may be produced or by duplicating the number of trains, or gangs of such mechanism operated from a common source, the machine may be enabled to produce any number of fabrics at a single operation. In the present instance, the particular machine herein shown is constructed to simultaneously weave three separate and independent fabrics, but it will be understood that a machine constructed on the same general principles may be enabled to weave one, two, or any other number of fabrics at the same time, according to the number of trains or gangs of coiling and weaving devices in such machine.

My machine also embodies and my invention contemplates novel and efficient mechanism for causing the weaving at any particular or predetermined location and in any number, of extra wires or so called cords for strengthening purposes, such cords being run longitudinally of the fabric at intervals intermediate the width thereof and also at the sides of the fabric to form borders therefor. My cording or pattern mechanism, which thus determines the particular pattern of the fabric, is arranged to meet all requirements as to the particular style or pattern of fabric as respects the cords, inasmuch as it is capable of following any pattern which may be desired, the operation of the machine in respect to the running of the cords being entirely automatic after the desired pattern is supplied thereto.

Furthermore, my machine embodies many other novel and advantageous features of construction and means of adjustment for other purposes, as well as means for automatically controlling and stopping the machine in case the wire should be knotted as it comes from the reel, or should become snarled in the machine.

In the drawings Figure 1 is a perspective of my machine looking at the front end thereof; Fig. 2 a side perspective of the machine; Fig. 3 a perspective of the machine taken from a point towards the rear end of the machine; Fig. 4 a plan perspective of the machine; Fig. 5 a longitudinal section of the front end of the machine on the line 5—5 of Fig. 4; Fig. 6 a transverse section of the lower feed roll; Figs. 7 and 8 detail views of parts of the lower feed roll; Figs. 9 and 10 detail views of the guides for the wire before it enters between the feed rolls; Fig. 11 a perspective of one of the coilers; Fig. 12 a perspective of one of the tension devices working in connection with the coiler; Fig. 13 an elevation of the feed rolls and the mechanism for intermittently applying pressure to the pressure rings of the lower feed roll with a portion thereof in section; Fig. 14 a longitudinal section of the upper feed roll; Fig. 15 a detail view of the means for adjusting certain parts associated with the trigger frame; Fig. 16 a cross section of the oscillating head illustrating the frame or housing of the trigger frame; Fig. 17 an elevation of said trigger frame; Fig. 18 a detail view illustrating the cut-off mechanism and means for adjusting the same; Fig. 19 a section on the line 19—19 of Fig. 21; Fig. 20 a side elevation of the trigger frame, its housing and triggers therein; Fig. 21 a cross section of the parts illustrated in Fig. 20; Fig. 22 a perspective of a detail of the slide 78; Fig. 23 a detail of one of the triggers showing diagrammatically its path of movement in a complete operation; Fig. 24 a sectional elevation on the line 24—24 of Fig. 27; Fig. 25 a sectional plan on line 25—25 of Fig. 24; Fig. 26 a detail view of the yielding connection between members 166 and 170; Fig. 27 a section on the line 27—27 of Fig. 24; Fig. 28 a section on line 28—28 of Fig. 27; Figs. 29, 30 and 31 transverse sections of one of the wire ways showing the movable parts in different relative positions assumed by them in the weaving process; Fig. 32 a transverse section of one of the wire ways or channels, taken at a different point than Figs. 29 to 31, taken through the yoke 151 and illustrating the parts composing such wire way or channel; Figs. 33 and 34 detail views of the plates or strips 139 and 140; Fig. 35 a plan view of the rear end of the machine illustrating the means for actuating the rolls for feeding the coils from the wire ways or channels; Fig. 36 a section on an enlarged scale taken on the line 36—36 of Fig. 35; Fig. 37 an end elevation of the parts shown in Fig. 35; Fig. 38 a sectional elevation on the line 38—38 of Fig. 39; Fig. 39 an elevation of the parts illustrated in Fig. 38; Fig. 40 a plan view of certain of the parts shown in Figs. 38 and 39; Fig. 41 a sectional elevation taken on the line 41—41 of Fig. 42; Fig. 42 an elevation of the parts shown in Fig. 41; Fig. 43 a detail view illustrating the means for adjusting one of the side walls of the weaving channels which are illustrated in section; Fig. 44 a section taken on the line 44—44 of Fig. 43; Fig. 45 a perspective of the wire reels and stop mechanism arranged in front of the machine; Fig. 46 an enlarged elevation of a portion of said stop mechanism; Fig. 47 a vertical section of one of the pulleys or sheaves which first receives the wire as it comes from the reel; Fig. 48 a detail view illustrating one of the movable electrical terminals arranged in advance of each coiler; Fig. 49 a detail view illustrating the means for oscillating the movable head at the front of the machine; Fig. 50 a detail view of the means for operating the link 267; Fig. 51 an elevation of the pawl carrier 204 and associated parts; and Fig. 52 a section of the yielding connections for operating the bars 133 of the yielding shutters.

Referring more particularly to Figs. 1, 2 and 3, the machine is provided with a main frame 1 of suitable size and dimensions for the purpose of supporting the working parts of the machine. For convenience, I will hereinafter refer to the left hand end of the machine shown in Figs. 1, 2 and 3, where the coilers are located as the forward part, and the other end as the rearward part of the machine. As shown more particularly in Figs. 1, 4 and 6, the working parts of the machine, including the coilers and feed rolls, are mounted in an oscillating frame or head 2, arranged to reciprocate in a horizontal plane for a purpose hereinafter made apparent. As seen in Fig. 16 the parallel sides of this oscillating frame are arranged to slide in the outer sides of the main frame in any suitable manner and such head is arranged to be positively operated by operating connections hereinafter described.

The feed rollers are two in number and arranged to feed the wire from the reels to the coilers in advance thereof. The upper feed roll comprises a shaft 3 journaled at its ends in bearings which may be adjustable in suitable manner in the sides of the oscillating head. This shaft which is driven by a train of gears hereinafter referred to, is surrounded by a series of sleeves 4 secured thereto and to which are applied the inner rings $3^a$ separated by the distance sleeves 4 and collars $4^a$, Fig. 14. On the rings $3^a$ are pressed the hardened rings 5, which engage the wire and which, in connection with similar rings on the lower feed roll, feed the wire to the coilers.

As shown in Figs. 5 to 8 and 13, the lower feed roll comprises a shaft 6, whose ends are journaled in bearings vertically adjustable in suitable manner in the ends of the adjustable head. This shaft is surrounded by a series of pressure rings or collars 7, each having a yielding connection with the shaft 6 through the medium of a coiled spring 8, the inner end of which is secured to the shaft 6 and the outer end to the inner surface of its collar, by the keys 9, respectively, Figs. 5 and 6. These pressure rings may be spaced in the same manner as those of the upper feed roll.

Inasmuch as the coiled wire fabrics are usually made from a pair of wires run practically as a single strand, the pressure rings 7 of the lower feed roll and the corresponding rings 5 of the upper feed roll are arranged in pairs corresponding to the coilers, so as to feed the pairs of wire from the reels to the coilers. In the present instance, the machine is provided with three gangs of mechanism arranged to simultaneously coil and weave three separate fabrics and consequently the feed rolls are each provided with three pairs of pressure rings or collars for feeding the six wires which are required for weaving the three separate fabrics, as clearly indicated in Fig. 13.

As above described, the pressure rings or collars of the lower feed roll are not directly secured to or actuated by its shaft, but only through the yielding connection afforded by the springs. Moreover, the arrangement is such that no pressure is exerted by the pressure rings or collars of the lower feed roll, except when the latter are forced upwardly eccentric to their driving shaft, with the result that the pressure is exerted upon the wires being fed into the machine. When, however, the pressure, thus forcing the pressure collars eccentric, is relieved so that these collars resume their concentric relationship with their shaft, no pressure is exerted upon the wire and no feeding thereof takes place. This applying and relieving of pressure is intermittent and automatic and the wire feed is correspondingly intermittent.

For the purpose of moving the pressure collars of the lower feed roll eccentric of their shaft for the purposes above stated, I provide suitable mechanism coöperating with each pair of pressure collars, such mechanism being arranged to be operated automatically at the proper time when it is desired to have the wire fed into the machine. As shown more particularly in Figs. 1, 5 and 13, each of such mechanisms comprises a pair of yokes or cradles 10 having on opposite sides pairs of rollers 11 arranged to coöperate with the corresponding pair of pressure collars 7. The cradles are provided with depending stems 12, whose lower ends pass through a bracket 13 and bear upon the upper face of a bar 14, which in turn is fulcrumed at its central point upon a spring pressed pin 15, Figs. 5 and 13. This pin is arranged to slide in the bore of an angular block 16, which is received by an adjustable bracket or plate 17. The block 16 is drilled from its top part way of its length and tapped as to its lower end so as to receive the screw-threaded adjusting screw. As indicated in Fig. 13, a slot is cut in one side of the block 16 so as to expose the head of the adjusting screw 18, which head is provided with holes to receive an instrument for the purpose of adjusting the screw and thereby causing the spring 19 interposed between it and the pin 15 to exert more or less tension.

The lower end of each block 16 is provided with a roller 20 arranged in the path of movement of a cam 21 which is mounted upon a bar 22. This bar is reciprocated automatically by the machine and at the proper time by the operating connections hereinafter described. When the parts are at the relative positions indicated in Fig. 13, the blocks 16 are projected to their lower limit of movement and are resting upon the upper edge of the bar 22, but when such bar is removed to the right, Figs. 1 and 13, the cams 21 will ride underneath the rollers 20 and thereby raise the blocks 16 upwardly. This movement is communicated through the springs 19, pins 15 and rollers 11 to the pressure collars of the lower feed roll, which collars are thereby forced eccentric of their shaft, with the result that pressure is applied to the wire and the latter caused to be fed into the machine. As shown in Figs. 1, 5 and 13, each cam 21 is arranged to be independently adjustable by sliding longitudinally of its bar 22 so that at the will of the operator any one or more of the sets of pressure collars may be put under tension to feed the wire when it is desired to temporarily run the feed rolls by hand in case any wire should become snarled in the coilers or weaving devices. To this end each cam 21 is arranged to slide longitudinally upon its bar and is provided on its lower edge with rack teeth arranged to be engaged by a pinion 23 journaled on the outer side of the bar 22 and operated by the handle 24. By turning the handle in one direction or the other, the cam 21 is correspondingly reciprocated. By preference, each cam is provided with an adjustable stop which, as shown in Fig. 13, comprises an adjusting screw 25 screwing through a projection 26 on the bar 22 and arranged in the path of movement of its cam 21.

Inasmuch as it is found in practice that the wire from one reel is apt to run faster than the wire from its companion reel, notwithstanding the same amount of pressure applied by the feed rolls, it becomes necessary to provide for a greater pressure upon one wire than upon its companion wire so as to obtain a uniform feed. I accomplish this result by making each bracket 17, which carries the block 16, adjustable laterally so as to change or shift the position of the fulcrum of the bar 14 laterally with respect to the lower ends of the stems of the cradles. Ordinarily, that is when the same pressure is to be applied to both pressure collars or the same pair, the stems of the cradles corresponding thereto are positioned at equal distances on either side of the vertical line of the fulcrum of the bar 14, as indicated in Fig. 13, but when it is desired to apply the pressure unevenly to these pressure collars, the bracket 17 is shifted laterally in one direction or the other, according to whichever pressure collar requires the greater pressure. It will be seen that by shifting the fulcrum the relationship of the stems of the cradles with relation thereto will be disturbed and the pressure consequently transmitted unevenly thereto. As shown in Fig. 13, the adjustment of the bracket 17 is brought about through the medium of the similar adjusting screws 27, arranged at either side of the bracket and engaging the same. These adjusting screws also engage the stationary lugs or projections 28 on the cross piece of the oscillating head 2. By preference, the brackets 17 are dove-tailed into this cross-piece, as seen in Fig. 5.

Referring next to the train of driving mechanism for the feed rolls, as clearly shown in Figs. 1, 2, 3 and 4, the motion is transmitted from the driving pulley 30, clutch 31 of any suitable construction, to a driving shaft 32. This driving shaft is provided with a worm 33 and also at its inner end with a pinion 34, which meshes with a gear 35. This gear meshes with a pinion 36 upon the extended shaft 6 of the lower feed roll, which shaft is also provided with a pinion 37, in turn meshing with a pinion 38, secured to the shaft 3 of the upper feed roll. The pinion 36 is feathered on its shaft 6 so that it may be moved longitudinally thereof, out of mesh with the gear 35, so that the shaft 6 may be operated by hand whenever desired, independently of the remainder of the mechanism.

Referring to the operating connections for the reciprocating bar 22 the same comprises a worm gear 39 meshing with the worm 33 and secured to a main driving shaft 40 extending longitudinally of the machine, Figs. 1, 2 and 3. This shaft is provided with a cam 41 of peculiar construction, as hereinafter described, and the same is adapted, through the medium of the rocker arm 42 and its cam roller 43 to rock the depending arm 44 secured to its upper end to the rock shaft 45, to which the arm 42 is secured. The lower end of this depending arm 44 is operatively connected with the reciprocating bar 22, with the result that upon the rotation of the cam 41 the arm 44 is rocked laterally and the bar 22 correspondingly reciprocated. As stated, the cam 41 is of peculiar construction, inasmuch as it provides for an adjustment of the relative length of the period during which the bar 22 is in one position or the other. To this end, the cam-way is made adjustable by forming the inner wall of the cam way as a ring 46, which ring is adjustable upon the hub 47 of the cam. To hold the adjustable ring in its different positions I provide a locking screw 47 arranged to engage one of a series of screw-threaded holes. When the adjustable ring 46 is moved in one direction or the other, the high and low sides thereof are adjusted relatively to the high and low sides or summits of the outer cam roll, with the result that the length of the two dwells in the cam are lengthened or shortened, as the case may be and the length of time required during which the reciprocating bar 22 remains in one position or the other is correspondingly lengthened or shortened, as the case may be.

In front of the feed rolls are located guides arranged in pairs and through which the wires are caused to pass before reaching the feed rolls. As shown in Figs. 1, 5, 9 and 10, these guides comprise two portions 50 and 51, the lower portion 50 being a rectangular block secured upon the bracket 52 on the oscillating head and grooved longitudinally to receive a corresponding depending rib or fin 53, on the upper member which is likewise in the form of the rectangular block or plate. The upper block 51 simply presses upon the wire as it passes through the channel of the lower block 50, with its own gravity, but the same is prevented from being displaced in suitable manner, as by means of a cross arm 54 held in position above the bracket and across the pair of the blocks 51 by a post 55 extending into the bracket 52.

After the wire passes through the guides the same is delivered to the feed rolls and is then passed through the coilers now to be described. These coilers are in the present instance, (in the three-gang machine now being described) six in number, arranged in three pairs, the description of one coiler applying to all. As shown in Figs. 5 and 11, each coiler is substantially a cylinder 56, which is spirally grooved on its exterior so as to form, in connection with the incasing shell 57, the necessary spiral path for the wire, as the same is forced therethrough by means of the feed rolls, the coiler being beveled on its forward end so as to fit closely between the feed rolls and to receive the wire as it is fed therefrom. To hold the coilers and their shells in place, I provide each coiler and shell with a pin 58 extending through the shell and anchored into the block 59, which is provided with transverse grooves arranged to receive the shells. The coilers and shells are locked in place by means of the set screw 60 passing through the transverse bar 61 rising from the block 59 and pressing at its lower end against said shell.

For the purpose of adjusting the coils of the wire to the proper and desired pitch I arrange behind each coiler a tensioner comprising a cylinder 62, Figs. 5 and 12, also arranged within its own incasing shell 63 and provided with a spiral groove 64. This groove is enlarged at its forward end and arranged to register with the groove at the rearward end of the coiler but by the rotary adjustment of the tensioner the continuity of the spiral path of the wire is altered as it leaves the coiler and the pitch of such wire is thereupon determined, inasmuch as the wire is put under a tension and the pitch is lengthened or shortened according to the particular adjustment of the tension. To hold the tensioner in position and to permit of its adjustment to a nicety I provide each of the incasing shells 63 which are secured to their tensioner 62 by a pin 65 with a worm gear 66, Fig. 15. Each tensioner is provided with independent adjusting mechanism and to this end each worm gear meshes with a worm 67 journaled in a cross cap 68 secured to the block 59. Each worm is connected with an operating thumb wheel 69 projecting upwardly above the cap 68. By turning the thumb wheel in one direction or the other the tensioner is correspondingly adjusted or rotated for longer or shorter pitch of coil.

As the wires are coiled by two companion coilers, the same are passed rearwardly of the machine to the cut off device comprising first a strand-uniting guide 70 similar to a coiler and by which the two companion wires are brought together and thereafter run as a single strand, and second, a cut off proper comprising a knife block 71 and a knife 72 which is secured upon the reciprocating cutter bar 73, Figs. 5, 18, 20 and 21.

As seen in Figs. 18, 20 and 21, the cylinder 13 which forms the wire-uniting guide, has a portion of its rearward end cut away or reduced so as to form the knife block 71 and the spiral groove around such cylinder terminates at its rearward end upon the face of such knife block over which the knife 72 passes, with the result that the two wires now running as a single strand are cut off whenever the cutter bar is reciprocated in the proper direction. The series of cut offs are secured in suitable manner to a cross bar 74, which is adjustable longitudinally of the machine towards and away from the coilers in a manner and for a purpose herein explained.

In order to reciprocate the cutter bar and thereby cause the knife to operate at the proper predetermined time, I provide suitable operating connections comprising, in the present instance, an operating lever 75 which is pivoted at its upper end to a block 76 secured to the cross bar 74, Fig. 16. This lever is connected at a point intermediate its length with the cutter bar by means of a transverse pin 77 and the lower end of such operating lever is operatively connected with a transversely sliding plate 78, Figs. 19 and 21. This plate is provided with an actuating pin 79 arranged to enter the angular opening formed in the slot of the operating lever 75. The object of the slot and pin connection between the sliding plate and the lever 75 is to permit the trigger mechanism hereinafter referred to, to be operated in advance of the cutter bar, it being understood that the lever 75 cannot be operated until after the pin 79 has traversed the length of the slot and contacted the opposite end thereof, so that the cutter bar is moved only near the last movement of the sliding plate.

The sliding frame is supported and arranged to slide in a frame 80 hereinafter referred to as the trigger frame which is itself supported within a housing 81. This housing is supported by and forms a part of the oscillating head, but is adjustable in relation therewith. By preference, and as indicated in Figs. 5 and 21, the sliding plate 78 is dovetailed into the trigger frame 80. In order to reciprocate the sliding plate, I provide the same on one side with a block 82, having a suitable opening to receive the upwardly extending pin or bolt 83 extending upwardly from a block 84 arranged to reciprocate upon a slide 85 on the lower cross piece of the housing 81, Figs. 16, and 19, 20 and 21. This sliding block is connected by means of an operating link 86 with the power or driving mechanism, as hereinafter described.

To properly position the wire (or rather pair of wires forming the double strand in a double wire fabric) after the same has been cut off, in order that the next succeeding wire which is to be run as a cord may not be interfered with in the running thereof, I provide suitable mechanism located rearwardly of and associated with each cut off mechanism, to the end that when the cords are being run, the coil or wire already run may be drawn forwardly to a slight extent, after being cut off. As shown in Figs. 18, 20 and 21, such positioning mechanism comprises a finger 87 arranged to have an irregular movement adjacent to and below the coil as it is run, such movement being downwardly below the coil, rearwardly, upwardly and thence forwardly in contact with the coil, such path of movement being diagrammatically illustrated in Fig. 23. This finger or trigger 87 forms the upper extension of an arm 88 pivoted at its lower end to a rocking lever 89. This lever is secured to a transverse rock shaft 90 which is provided near one end with a projecting actuating arm 91, whose extreme end is operatively connected with a lever 92. This lever is pivoted to the forward side of the slide 78. In order to rock the lever 92, the other end thereof is provided, as seen in Figs. 19 and 22, with a stud 93 adapted to travel in a cam slot 94 formed in a block 95 which is secured to and substantially closes an angular opening in the slide 78. As this slide moves, it first causes the arm 91 to move upwardly, due to the descent of the stud 93 in the descending portion of the cam-way 94, after which the stud rises to the top of the cam-way, due to the tension of the spring 96, which has been resisting said movement of the arm 91 and consequently of the rock shaft 90. The stud 93 then moves laterally with respect to the cam-way and trips the spring pressed pawl 97 downwardly, which finger springs upwardly again in normal position after being cleared by the stud 93. The result of this movement of the stud is to partially rock the shaft 90 and thereby raise and lower the finger 87. However, the trigger is subject to another movement due to its connection with a rock shaft 98, to which is connected, through the medium of the link 99, a crank arm 100 secured to such rock shaft. This rock shaft is provided with a forwardly extending actuating arm 101 whose extreme free end extends into and is actuated by a cam slot 102 formed in the slide. The shape of this cam slot is such that the arm 101 is moved up and down as the slide reciprocates, so that, through the medium of the connections described the trigger 87 is given a rearward and forward movement, the result of the movements being substantially as illustrated in Fig. 23. The rock shaft 98 is held in normal position by the pressure of the coiled spring 103, which serves to take up the lost motion.

Associated with each trigger mechanism is a retaining finger 104 arranged substantially behind the finger 87 and adapted to retain the coil rearwardly thereof in its normal position at the time when the finger or trigger 87 is operating to displace the same, as described. This finger extends upwardly from a horizontal plate 105, whose forward end is mounted on the trigger frame 80 and is adjustable thereon, as hereinafter described. The rearward edge of the upper end of the finger 104 is inclined, in order that when the same is depressed or moved downwardly it will cause the coil which has been previously run and cut off, to be moved and held against the coil just run in to serve as the cord.

In order to accommodate changes in the pitch of the wire for weaving wire fabrics of different pitch, it becomes necessary to provide adjustments of the trigger 87, finger 104 and the cut off mechanism, such adjustments being independent of each other so that the parts just referred to may be adjusted relatively to each other. In the present instance, these parts are made adjustable as follows.

Referring first to the adjustment for the cut off mechanism, as seen in Figs. 18 and 20, the cut off is secured by a bolt 106 to a transversely movable bolt 107, arranged to slide within a support or bracket 108 which serves to connect the trigger frame 80 and housing 81 to the oscillating head as seen in Fig. 16. The forward end of the bolt 107 is screwthreaded and surrounded at this point by a worm gear 109 bearing within the bracket and meshing with a worm 110 mounted in the same bracket. Each end of the cut off mechanism is provided with the adjusting mechanism described and to transmit the movement from one side to the other the shaft portion 111 of the worm 110 is extended transversely of the machine and provided at such other side thereof with the similar worm operating similar mechanism for adjusting both ends of the cutter bar in unison. By turning these worms in one direction or the other the cut off mechanism is moved forwardly or backwardly as the case may be.

Referring next to the adjustment for the trigger mechanism, the entire housing which supports the same is made adjustable in the following manner. Each side of the housing is provided with an upwardly extending plate 112, whose upper end is secured to a sliding bolt 113, the forward end of which is surrounded by a worm gear 114, mounted in the bracket 108 and arranged to mesh with a worm 115 also mounted in such bracket. The shaft portion 116 of this worm extends transversely of the machine and serves to transmit the motion from one side to the other. By preference, the shafts 111 and 116 are arranged to be operated one at a time from a common source, and to this end, the shaft 111 is provided with a pinion 117 and the shaft 116 with a similar pinion 118, both of which are adapted to be moved longitudinally of their shaft for the purpose of engagement, one at a time, with a master gear 119. This master gear is arranged at the inner end of a shaft 120, Figs. 16 and 20, which is journaled in the bracket 108 and extends extraneous of the machine, where its outer end may be provided with an operating handle 121. When the handle is turned in one direction or the other, either the cut off mechanism or the trigger mechanism is operated according to which pinion 117 or 118 is at that time in engagement with the master gear.

Referring to the adjustment of the finger 104, its supporting plate is secured upon sliding bolts 122 supported at the ends of the trigger frame, and whose forward screwthreaded end is surrounded by a worm gear 123 arranged to mesh with a worm 124, as seen in Fig. 17. Each of the series of three fingers 104 is similarly mounted and the shaft 125, on which the worms 124 are formed, extends transversely of the machine, the same being provided at a suitable point with a milled hand wheel 126, for the purpose of manually rotating such shaft and consequently the worms 124. By rotating the shaft in one direction or the other, the fingers 104 are moved forwardly or backwardly as the case may be.

For the purpose of raising and lowering the trigger frame within its housing, I provide a rock shaft 127 journaled in the housing, as seen in Figs. 20 and 21, and provided at its ends with similar parallel operating arms 128, which are slotted to receive the studs 129, projecting laterally from the opposite sides of the trigger frame and projecting through vertical slots in the side walls of the housing. The operating arm 128 on one side is extended and the same is operatively connected with the power mechanism for automatic operation, as hereinafter described.

The wires as coiled are delivered to the weaving devices by which successive coils or strands are woven or interlocked in order to form a complete coiled wire fabric. Each pair of coilers is provided with one of the weaving mechanisms, there being in the present instance three of them, similar in construction and operation. Each weaving mechanism comprises essentially a weaving channel formed by stationary and movable bars in association with movable members working partially over the weaving channel from opposite sides thereof and serving to engage and eject the fabric as it is being formed.

Referring to the present construction as more particularly illustrated in Figs. 3, 4 and 29 to 32, the weaving channel is formed by parallel bars or strips 130 and 131, of which the former is stationary and the latter movable in a vertical plane. Each strip is formed at its upper end with a thickened flange and recessed at its upper inner side or corner so as to receive the longitudinal actuating bars 132 and 133, respectively, which bars are moved longitudinally in the manner hereinafter explained. Referring first to the bar 132, the same is substantially the same length as its strip or plate 130 and provided with a series of upwardly extending pins 134, which are received by oblique slots 135 in a plate 136, transversely movable upon the top surface of the plate 130 and hereinafter designated the retaining shutter. In order to hold this shutter in place upon its plate or strip 130, I provide screws 137 passing through transverse slots in the shutter and screwing into the plate 130. In like manner, the actuating bar 133 is adapted to slide longitudinally in its plate 131 and is provided with a series of upwardly projecting pins 138 received by oblique slots in a plate 139, movable transversely upon the top surface of the plate 131 and hereinafter designated the ejecting shutter. This shutter is arranged to slide beneath a plate 140 which is held in place and secured to the plate 131 by means of the screws 141, passing through the plate 140 and screwing into studs 142, which are accommodated by transverse slots 143 in the ejecting shutter. This plate 140 is arranged to form a continuation of one of the walls of the channel and to this end such plate is provided adjacent the channel with a flange 144, projecting upwardly and also downwardly to substantially meet the lower projecting lip 145 of the ejecting shutter. The actuating bar 133 is operated in substantially the same way as the bar 132, as hereinafter described.

Inasmuch as I have provided electrical means for holding and clamping the wire last run in the channel, I arrange a plate or strip 146 of brass or other non-magnetic material on the inner face of the stationary plate 130 and likewise I provide a similar plate 147 on the inner side or face of the movable plate or strip 131. During the ejecting operation the fabric is raised bodily upwards by the upward movement of the side plate 131 and the parts attached thereto, including the ejecting shutter 139. By preference, I line the plate 146 with an easily removable wear plate 148 which receives the wear or friction of the wire coils and which may be readily replaced, when desired, by a new plate.

The electrical device for clamping the coil last run in the channel comprises an elongated electro magnet 149 which is of a size to fit within the weaving channel in such a manner that its magnetic poles form the bottom of the channel and are supported on blocks 150 in the channel. As shown, there is a series of these magnet supporting blocks arranged at intervals along the length of the weaving channel and the same are received in vertical recesses in the plate 147, forming one of the walls of the channel. The plates and other parts forming the weaving channel are held in place by a series of yokes 151 arranged at intervals along the length of the weaving channel. As shown, the stationary members or plates 130 and 146 are secured to said yoke by a screw 152, while the magnet supporting blocks are secured thereto by screws 153.

As shown in Figs. 29 to 32, I interpose between one of the upright walls of the yoke and the outer surface of the movable plate 131 a thin strip or fillet 156, which is removable, as hereinafter explained, for the purpose of widening the weaving channel in order to provide for the weaving of fabric with a larger diameter of coil. It will be understood that the electro magnet is connected with a circuit breaker automatically operated, as hereinafter described, whereby the magnet may be energized and deënergized at the proper time in the cycle of operation of the machine.

In explaining the mode of operation of the weaving devices, it will be assumed that the fabric has already been started or developed to the extent of three coils, as seen in Figs. 29, 30 and 31, such coils being marked $a$, $b$, and $c$, and that a fourth coil marked $d$ has just been run into the channel and has been interwoven with the previously run coil marked $c$. At this time the electro magnet is energized, Fig. 29, with the result that the coil $d$ is held firmly along its entire length to the bottom of the channel and the ejecting shutter 139 has its lip 145 in engaging position in the intersection between the coils $b$ and $c$, inasmuch as the ejecting shutter is at this time projected inwardly and partially across the channel. The retaining shutter 136 is now in its idle or outward position, free of the weaving channel, so as not to interfere with the completed fabric as it is being ejected. Moreover, the movable side of the channel is at this time in its intermediate position ready to rise and thereby eject the fabric. When the shutter has risen to its upward limit of movement, as seen in Fig. 30, the lower helix of the coil $c$ is adjacent the upper helix of the coil $d$, it being understood that the magnet is energized during the ejecting operation, so that the coils $c$ and $d$ can be brought to the proper relative position, as seen in Fig. 30, which operation requires that the coil $d$ shall be held in the bottom of the channel while the other coils are being ejected. When the ejecting shutter reaches its upward limit of movement the retaining shutter 136 is moved inwardly so as to engage in the intersection between the coils $b$ and $c$, so as to retain the fabric in proper position in the channel and prevent its escape therefrom. Just as the retaining shutter takes its engaging position, as shown in Fig. 30, the ejecting shutter is retracted clear of the weaving channel and this movement is immediately followed by the descent of the movable side of the weaving channel, together with its shutter. When such shutter reaches its lowermost position, as seen in Fig. 31, the same is moved inwardly to a position at the intersection of the coils $c$ and $d$ and at the same time the retaining shutter is withdrawn clear of the channel. The ejecting shutter and movable side walls of the channel move upwardly to the intermediate position illustrated in Fig. 29, carrying the previously run coil $d$ to the position formerly occupied by the coil $c$, it being understood that the magnet at this time is deënergized so as to permit the free upward positioning of the coil $d$. The parts are now in position to permit a new coil to be run into the weaving channel and to permit the same to be woven into the fabric in the same manner as the latter coil had been woven with the coil $c$. This completes a cycle of the weaving movement of the parts composing the weaving channel or wire way.

As shown in Figs. 43 and 44, the stationary plates 130 of the weaving channel are secured at each end to a bracket 157 having a series of upright arms 158. Each of these brackets is mounted for adjustment upon the ends of the main frame of the machine, such brackets being adjustable transversely and downwardly simultaneously and to equal extents. To this end, the bracket is provided with depending inclined projections 159 adapted to engage correspondingly inclined surfaces 160 of a plate 161 secured to the machine frame, these surfaces having a 45 degree inclination. In order to shift the bracket 157, I provide the same with a vertical slot 162 adapted to receive a pin 163, which is eccentric of a shaft 164 extending through the machine frame 1 and operated by a handle 165. An operating link 165$^a$ may be connected with this handle and extended to the side of the machine for convenient manipulation by the operator (Figs. 1, 3 and 43). It will be observed that by turning this handle the bracket 157, together with the normally stationary side of the weaving channels will be moved both downwardly and laterally or vice versa, according to whichever way the handle is turned, with the result that these sides of the weaving channels are given two movements, either a downward or upward movement and a corresponding inward or outward movement. The adjusting mechanism at the other end of the machine is similar to that illustrated in said Figs. 43 and 44, and the same description applies to both. The object of this adjustment is to provide for the widening or narrowing of the weaving channel so as to permit of the coiling of fabric of greater or less diameter of coil.

It is necessary or desirable that the other or movable side 131 of the weaving channel be adjusted, that is moved inwardly or outwardly and also upwardly and downwardly to correspond to the adjustment of the other side of the weaving channel. In order to provide the lateral adjustment of the movable side of the weaving channel, I remove or insert the fillet 156, already described, the presence thereof providing for the smaller diameter of coil and the absence thereof providing for the larger diameter. In order to adjust the height of the movable side of the weaving channel or rather the degree of upward movement thereof in order to correspond to an adjusted height of the stationary side thereof, I adjust operating connections hereinafter referred to.

As hereinbefore stated, the actuating bars 132 and 133 are automatically shifted longitudinally forward and back at the proper time by suitable operating connections, see Figs. 3, 4, 24 and 25. Referring first to the connections associated with the bar 132, the same comprise a main rock arm 166 secured to and depending from a rock shaft 167, arranged transversely at the rear end of the machine and provided with a series of three upwardly extending rock arms 168 corresponding in number to the number of bars 132 of the present machine and operatively connected with such bars by means of the links 169. The rock arm 166 is operated intermittently by suitable connections with the driving mechanism and in the present instance the same is connected by means of a link 170 pivoted to the lower end of the rock arm 166 and extending forwardly in the machine frame where it is pivotally connected with a longitudinally reciprocating and intermittently operated bar 171, Fig. 25. This latter bar is actuated by means of a cam 172 secured to an intermittently operated longitudinal shaft 173 operatively connected at its forward end with the power mechanism in a manner hereinafter described. This cam coöperates with a pair of cam rollers 174 mounted on the inner side of the bar 171, with the result that in every rotation of the shaft 173 the bar 171 is reciprocated and such movement being transmitted through the rock arms described, to the reciprocating bar 132. In order to adjust the degree of movement of the bar 132 the link 170 is pivotally connected to the rock arm 166 by means of a bolt and slot connection, such rock arm being provided with the longitudinal slot 175. By adjusting the connection between the link 170 and the rock arm 166 up or down the degree of movement of the bar 132 is lengthened or shortened as the case may be. In the present instance, provision is also made for automatically taking up surplus movement of the link 170 at the time when cords are being run, in which case the inward movement of the shutter 136 is not as great as when the ordinary coils are being run. To this end, as shown in Figs. 24 and 26, the angular head 176 of a bolt 177 is arranged to slide in the slot of arm while the body portion of such bolt passes transversely through slots in the link 170 and across the inner end of a longitudinal bore therein. This bolt is spring pressed inwardly to the end of the bore by means of a coiled spring 178 arranged in a bore in the outer end of the link 170 and whose tension is adjustable by means of a screw plug 179. Thus the surplus movement is taken up by the outward movement of the bolt 177 and not communicated to the shutter 136 at the time stated.

Referring next to the operating connections for the bar 133, which controls the ejecting shutter, these connections are similar to the connections for operating the bar 132, the same comprising the main rock arm 180 secured to the rock shaft 181, upwardly from which extend a series of three rock arms 182, connected to their bars 133 by the links 183. Likewise, the rock arm 180 is provided with a connecting link 184. The link or connection 184 is also operated by a bar 185 similar to the bar 171 and likewise provided with a pair of cam rollers 186, with which coöperates a cam 187 on the shaft 173.

Referring next to the means for raising and lowering the movable side of the weaving channel and referring particularly to Figs. 24 and 25, the plate or strip 131 is secured to and carried by similar brackets 188 arranged to slide at opposite ends of the machine on the inner side of the main frame. The rear bracket is shown in detail in these figures and as the front bracket is similarly constructed, a description of the rear bracket will be sufficient. This bracket is provided with a series of upwardly extending arms 189, three in number in the present instance, to correspond with the number of weaving devices. These arms are secured to and support the side plates or strips 131 and communicate thereto the proper vertical movement necessary for the weaving and ejecting operations hereinbefore described. The bracket is operated by the main shaft 173 in the following manner.

A cam 190 is secured to the shaft 173 and provided with an internal cam-way which receives a cam roller 191 on the lower end of the sliding bar 192. This bar is pivotally connected at its upper end with a substantially horizontal arm 193 fulcrumed on the rock shaft 194. This arm extends rearwardly through a slotted frame or head 195 which is secured to the rock shaft 194 and transmits the movement of the arm 193 to such rock shaft. This rock shaft is provided with a pair of parallel arms 196 which are pivotally connected at their forward ends with the sliding bracket 188, with the result that in every rotation of the main shaft 173, the bracket 188 is caused to move up and back again. For the purpose of adjusting the amount of movement imparted by the shaft 173 and its cam to the arm 193, the pivotal connection of the bar 192 is adjustable in the slot 197 of the arm 193, Fig. 24. Furthermore, by moving cam bracket forward or rearward on shaft 173, provision is made for adjusting the elevation of the sliding brackets and consequently the height of the upward limit of movement of the movable side of the weaving channels, in other words, the adjusting of the range of movements of such movable sides. To this end, the head or frame 195 is provided with set screws 198 entering from opposite sides thereof and adapted to coöperate with opposite sides or edges of the arm 193, with the result that the range of movement, as distinguished from the amount of movement of the arm 193 may be adjusted. As stated, the sliding bracket 188 at the front of the machine is the same as that at the rear end, but for operating the front bracket the rock shaft 194 is provided, as shown in Fig. 3, with a depending crank arm 199 pivotally connected to a rod 200 extending longitudinally of the machine just inside the main side frame and connected to a similar rock arm 201 operatively connected in any suitable manner with a front sliding bracket, with the result that two brackets are moved simultaneously and likewise both ends of the movable side plates of the weaving channels are moved in unison.

Now describing the power or driving mechanism for actuating the different parts of the machine already described, and referring more particularly to Figs. 1 to 4 and 38 to 42, the different operating connections are primarily driven by the main shaft 40 extending longitudinally of the machine part way of its length and at one side thereof. This main shaft is provided with a crank 202 which coöperates with a pitman 203 operatively connected at its inner end with an oscillating pawl carrier 204. This pawl carrier, which is loosely pivoted on the shaft 205 as an axis, carries a spring pressed pawl 206 arranged on one side of the carrier and adapted to coöperate with a ratchet wheel 207, secured to the shaft 205. On the shaft 205 is secured a gear 208 arranged to mesh with a pinion 209 forming a member of the train of gearing terminating in a gear 210 on the forward end of the longitudinal shaft 173 which operates the weaving devices. In the present instance, the ratchet wheel is provided with ten teeth and the train of gearing is such that a one-tooth movement of the ratchet wheel will serve to turn the shaft 173 a single rotation, that is in the present instance the relationship between the ratchet wheel and the shaft 173 is as 1 to 10.

When the ordinary coils are being run (that is at other times than when the cords are being run), the rotation of the main shaft 40 simply oscillates the pawl carrier back and forth and moves the ratchet wheel a single tooth at each complete oscillation and consequently the weaving devices are operated at every operation of such pawl carrier. However, when the cords are run it becomes necessary to stop the movements of the weaving devices without stopping the movements of the other parts and to accomplish this result, I interfere with the normal operation of the pawl by holding the same in an inoperative position during the oscillation of the pawl carrier in such a manner that the pawl, although moved bodily by its carrier, is out of coöperation or engagement with its ratchet wheel, with the result that while its pawl carrier is moved or oscillated the ratchet wheel and all movable parts dependent thereupon remain stationary. To this end and as shown particularly in Fig. 3, the tail of the pawl is pivotally connected to a crank arm 211 secured to a pin 212 passing transversely through the pawl carrier and having at its other end an outwardly extending crank arm 213 provided with a lateral pin 214. According to the present construction, the pin 214 is arranged to be contacted by an interfering curved arm 215 which, normally, has no effect upon the normal action of the pawl but which, when stopped or held stationary, is interposed in the path of movement of the pin 214, with the result that the pawl is rocked and held to inoperative position during the oscillation of the pawl carrier.

As shown in Figs. 38 to 40, the interfering arm 215 projects from one side of a vertical slide 216 arranged to move up and down in a channel formed in a projecting bracket 217. This slide is slotted towards its lower end to encompass the main shaft 40 and to pass therebelow to operate certain connections hereinafter described. Intermediate its length, such slide is provided with a laterally projecting roller 218 adapted to coöperate with the periphery of a cam 219 secured to the main shaft 40, with the result that in the rotation of such shaft the slide is moved up and down. The slide is provided at its upper end with a forwardly extending arm 220 having a depending pin 221 adapted to enter a corresponding opening in a bracket plate or flange 222, projecting outwardly from the stationary bracket 217. This pin is arranged to enter this opening at every downward movement of its slide and such movement occurs continuously and successively during the running of the ordinary coils, but the same is adapted to be interfered with whenever a cord is run. This interference with the normal movement of the slide is brought about automatically by devices under the control of what I term pattern mechanism, whereby the fabrics may be woven according to any predetermined design or pattern which changes according to the particular location and the number of cords running through the fabrics, it being understood that the machine works automatically and continuously for inserting the cords, whether the same be the single cords intermediate the width of the fabric or be the so called border cords.

Referring to the pattern mechanism, as shown particularly in Figs. 1 to 4 and 40, I journal in the outer end of a bracket 223 the arbor or shaft of a pin wheel 224, whose pins project downwardly in the path of movement of a cam 225 on the main shaft 40, with the result that the pin wheel is turned the distance of one tooth at every rotation of the main shaft. To the upper end of the pin wheel arbor is secured a pinion 226 adapted to mesh with the teeth on the inner side of a pattern band 227 which is held in a horizontally curved plane between the two curved plates 228. It will be understood that the step by step movement of the pin wheel is imparted to the pattern band which is made of suitable material such as a piece of thin sheet metal. By preference, a spring pressed centering pin 229 is arranged to coöperate with the teeth of the pinion 226 to hold it against accidental displacement.

The pattern band is provided on its outer edge with a series of notches 230 corresponding to the points where the cords are to be inserted in the fabric, the present band having two hundred and forty-six teeth, representing two hundred and forty-six wires or weaves or pairs of wires in the fabric and having notches for the series of intermediate cords and also having series of notches grouped close together for the interposition of the border cords, but it will be understood as hereinafter evidenced, that the pattern may be varied as respects the number of the teeth and the particular location of the notches so as to produce any desired width of fabric with any desired number and location of cords. It will also be understood that the pattern band is employed solely for the purpose of causing the cords to be inserted according to a certain predetermined pattern or design, and that it is not concerned with a continuous weave of fabric having no cords.

In order to cause the interposition of the cords, the pattern band is arranged to control the movements of the slide 216 and to this end an arm 231 is pivoted upon the upper curved plate 228 and provided with a downwardly extending tooth 232, spring pressed in suitable manner against the outer edge of the pattern band and adapted to enter one of the notches 230, whenever the same is presented thereto. When the tooth enters a notch the rearward end of the arm 231 is moved outwardly into position directly over the hole or opening in the bracket plate 222 and into the path of movement of the pin 221 of the slide, with the result that the slide is prevented from being moved downwardly by the tension of the spring 233, indirectly connected therewith, as hereinafter explained, and the curved arm 215 is left in the path of movement of the pin 214. The pawl 206 is thereby rocked and held to inoperative position, that is out of engagement with its ratchet wheel during its oscillation with the pawl carrier and the weaving devices are at this time left inactive as required, for at this time a cord is being run into the fabric.

Referring next to the operating connections for the trigger mechanism, the same are operated by a cam 234 mounted on the main shaft 40 and of such contour as to give to the trigger frame its three different positions, the lowermost, intermediate and uppermost position. This cam coöperates with a roller 235 journaled on and in alinement with a slide 236 which is arranged to move up and down on the bracket 217 similarly to the other slide 216, but on the other side of the bracket. The upper end of this slide 236 is pivotally connected with a lever 237 pivoted intermediate of its length to the bracket 217 and pivotally connected at its other end to a vertically movable post 238 whose lower end is received by and movable within a socket or bearing 239, Fig. 38. This post is upwardly spring pressed by means of a spring 240, arranged in the bottom of the socket and pressing upwardly on the lower end of the post. This post is in turn operatively connected with a substantially horizontal operating lever 241 pivoted intermediate of its length on the main frame at 242. The forward end of this lever 241 is pivotally connected to a link 243 extending downwardly and connected at its lower end with the actuating arm or lever 128, hereinbefore described, and shown in detail in Figs. 20 and 21. By these connections and by the rotation of the cam 234, the trigger frame is given the three different positions already referred to during every rotation of the main shaft 40 except when the cords are being run, at which time the trigger frame is retained in its uppermost position, in the manner now to be explained. The slide 236 is under the control of its companion slide 216 inasmuch as when the slide 216 is arrested in its downward movement for the insertion of a cord, it is necessary that the trigger frame shall be held to its uppermost position, which involves the retention of the slide 236 in its uppermost position. To this end, the slide 236 is provided with a pin 244, which extends transversely through the bracket 217 and through a longitudinal slot in the slide 216, Fig. 38. The length of this slot is such that when the slide 216 is held in its uppermost position in the manner already described, the pin 244 is at the bottom of the slot in the slide 216, so that the slide 236 cannot descend further, with the results already explained.

Describing next the mechanism for oscillating the head 2 of the machine and referring particularly to Figs. 1, 2 and 38 to 42, the lower end of the slide 216 is pivotally connected to an arm 245 secured to a shaft 246, extending longitudinally of the machine and provided at its forward end with a lever 247, secured intermediate its length to the shaft 246. The opposite ends of this lever are operatively connected by means of the links 248 and 249, with oppositely acting dogs 250 and 251, which are arranged to control mechanism for making and breaking connection with a shaft operatively connected with the oscillating head. The dog 250 is loosely mounted upon the main shaft 40, while the dog 251 is pivoted upon the bracket 252, in whose outer end the rock shaft 246 is journaled. These dogs are arranged to be moved into the path of movement of an arm 253 secured at its lower end to a rolling key 254. This key is received in a longitudinal groove of a short shaft 255 on which is loosely mounted a gear 256, which gear meshes with a pinion 257 on the main shaft 40. The purpose of the rolling key is to operatively connect the gear 256 with the shaft 255 at the proper time, as controlled and determined by the dogs 250 and 251. The pin 253 of the rolling key is normally spring pressed to the right in Fig. 41, so as to tend to roll the key outwardly in a manner to engage either one or the other of two notches 258, in the hub of the gear 256. As shown, the tension mechanism for the rolling key comprises a spring barrel 259 pivoted to the inner side of a segment 260, which is fastened to the shaft 255. This barrel contains a spring 261 pressing against a pin or plunger 262 whose outer end is pivotally connected to the upper end 253 of the rolling key. Normally, the gear 256 and shaft 258 are in engagement, but the same are disengaged at the proper time by means of one or the other of the two dogs which are arranged to be swung inwardly towards the pin 253 of the rolling key which, when contacted by one of the dogs and restrained in movement turns or rolls the key out of engagement with the gear, thereby disengaging the parts and breaking the operating connection.

The motion of the shaft 255 is transmitted to the oscillating head through the following connections, shown more particularly in Figs. 4 and 50. Upon this shaft is secured a cam 263 arranged to work between a pair of cam rollers 264 which are mounted upon a slide 265, with the result that the slide 265 is reciprocated longitudinally of the machine. The movement of this slide is transmitted to a vertical lever 266 by a pin and slot connection therewith and the movement of such lever is in turn transmitted through a connecting rod 267 (see Fig. 50) to an arm 268 secured at its lower end to a transverse shaft 269 having at opposite ends pinions 270, which are arranged to engage racks 271 at opposite sides of the oscillating head, whereby the movements of the arm 268 are transmitted to the head and the same caused to oscillate back and forth at the proper predetermined times. For the purpose of accommodating different pitch of coils the oscillating head is arranged to be moved different distances and to this end the connection between the lever 266 and the connecting rod 267 is made adjustable, in the present instance, the lever 266 having a bolt and slot connection with the connecting rod 267, as clearly indicated in Fig. 2. Adjusting the connection of the link 267 up or down in the slot varies the degree of movement of the oscillating head.

The means for operating the cut-off mechanism and also the trigger mechanism comprise operating connections connected with the slide 78 and also with the main driving shaft 40. In the present instance a cam 272 is mounted on such shaft and serves to reciprocate a transverse rod 272ª (Figs. 2 and 4) which rod is connected to the rear end of a lever 273, whose forward end is pivotally connected with the rod or bar 86 hereinbefore described and clearly illustrated in Fig. 19.

It will be understood that the electromagnets of the weaving channels are arranged in an electric circuit and that an automatically operating circuit breaker is employed for energizing and deënergizing the magnets at the proper time. As shown in Fig. 2, the circuit breaker 274, which may be of any desired construction, is arranged on and operated by the main shaft 40.

My invention also contemplates novel construction and operation of mechanism for automatically stopping the machine when for any reason the wire becomes snarled in the machine, or before it reaches the machine. As shown particularly in Fig. 45, each of the two wires 275 for each set of coilers is led from the bundles 276 which surround the lower end of vertical drums 277. Each wire then passes upwardly over a narrow and deep grooved pulley or sheave 278, Fig. 47, journaled in the upper end of the supporting rod or pipe 279 but before reaching the pulley the wire is caused to pass through a spool-shaped sleeve 280 which serves to stop the wire in case of any knot or kink in the wire. Each wire then passes through guides or retainers 281. Both wires then pass through the automatically operated stop mechanism comprising a pair of pulleys or sheaves 282. Each pulley is journaled upon a stud 283 secured in a block having a rectangular portion 284 arranged to slide in a longitudinal slot 285 in a vertically extending arm 286. Each pulley is held in its upward position by means of a spring pressed arm 287 pivoted intermediate its length to a bracket 288, secured to the upper end of the arm 286. The lower end of the arm 287 is made hook-shaped so as to engage beneath the stud 283 and thereby hold its pulley in its upward position with a yielding pressure. This yielding pressure is afforded through the medium of a spring 289 bearing at one end against an adjusting nut 290 on a rod 291 pivoted at one end to a bracket 288 and at its other end against the upper end of the arm 287. If, for any reason, the pull or tension on one of the wires should exceed normal or some predetermined amount, the downward pull of the wire upon the pulley 282 will force the arm 287 rearwardly and thereby permit that pulley to drop to the lower end of the slot 285. At the same time a pin or projection 292 on the movable block will contact the inner end of a lever 293 and rock the outer end thereof upwardly, with the result that a rod or wire 294 will be moved upwardly and serve to connect the two terminals 295 of an electrical circuit which governs the clutch mechanism, as hereinafter described. After passing over the sheaves 282 the wires pass around sheaves 296 journaled at the outer end of the bracket 297 which also supports the vertical arm 236 which bracket is itself mounted upon one of the upright supports 279. From these latter sheaves the wires pass over guide wheels 298 and thence into the guides 50 which introduce the wire to the feed rolls. The purpose of providing the arm 287 with the elongated slot is to always assure a sufficient length of wire to finish a coil in the machine, or to afford a sufficient slack to supply the machine with free wire before it can be stopped.

The circuit in which the terminals 295 are arranged extends to a magnet 299 operatively connected with a latch 300, Figs. 1 to 4. This latch is pivoted at one end and is arranged to enter a notch in a transversely movable rod or bar 301 operatively connected with the lower end of the clutch lever 302. This clutch lever is spring pressed by means of the spring 303 to such a position as to hold the clutch out of engagement with the driving pulley. When, however, the clutch is moved to engaging position, the rod 301 is moved outwardly against the tension of the spring and the latch 300 will engage the notch on the rod 301, as soon as presented thereto and will automatically hold the clutch lever in engaging position. When, however, the electrical circuit is closed, as for instance, by the dropping of any one of the sheaves 282, as already described, thereby connecting the terminals 295, the magnet 299 will be energized and the latch 300 raised free from the rod 301, with the result that the clutch will be automatically disengaged and the machine stopped. Provision is also made for stopping the machine when from any cause the wire should become snarled after leaving the coilers and to this end I cause the wires to pass over an insulated plate 304 made of fiber or the like, Figs. 4 and 48, and arranged thereon are movable electrodes 305 preferably of thin sheet metal and having a handle 306 for manual operation when desired. When in place, one side of each electrode is in contact with a post or terminal 307, while the other side is slightly separated from the other terminal 308. In case the wires pass through and under the electrodes and in case any wire should become snarled and thereby contact the electrode the circuit would be established from the terminal 307 through the electrode 305 and through the snarled wires and through the machine frame, which completes the circuit, in which event the clutch will be disengaged in the same manner as before described. If, for any reason, the operator should desire to quickly stop the machine, this may be done by pressing the electrode 305 so as to cause the same to contact the terminal 308.

As hereinbefore stated, the present machine is a gang machine, capable of simultaneously weaving a plurality of fabrics—three fabrics in the present instance—although it will be understood that a machine embodying the same general principles may be made capable of weaving a single fabric and also that the number of gangs employed may be increased at will. It will also be understood that a machine having gangs of coilers and weaving devices may be arranged to weave a single fabric, in which event it is necessary to relieve the pressure collar 7, corresponding to the inactive gang or gangs and in the present instance, Figs. 1 and 5, I accomplish this result by means of a series of sliding keys 309, one for each pair of coilers. Each key is arranged to be pressed inwardly on top of the fulcrum block 14, so as to receive the pressure exerted by the spring 19 and prevent the pressure against the cradles and thereby prevent pressure on the pressure collars. These keys serve another purpose, inasmuch as, in case that one of the strands should become snarled, requiring stoppage of the machine, the key corresponding to that strand can be moved to operative position, thereby preventing further feeding of wire, but permitting the wires corresponding to the other gangs to be fed so as to complete its coils, whereupon the snarled strand can be removed and all the coilers started to work in unison.

By preference and as herein shown I provide means for cutting or trimming the rear ends of the fabrics and also for flattening or crushing the end coils for a purpose hereinafter explained. As shown in Figs. 24, 27 and 28, I provide a frame 312 mounted to slide longitudinally upon the longitudinal shaft or rod 313 of the frame and to be clamped thereto in adjusted position by the clamp 314, the other end of the frame resting upon any suitable fixed point or bracket of the main frame, such as the bracket 315. In this frame is arranged to slide the knife or trimmer 316, which is adapted to slide transversely of the machine and across a series of inclined slots 317 in the trimmer frame 312, such knife having cutting edges arranged to coöperate with similar but stationary cutting edges on the trimmer frame, with the result that the fabrics as they pass downwardly are automatically trimmed at their ends by the shearing action of the knife or trimmer. To operate the trimmer the same is pivotally connected with an operating connection 318 pivotally connected to the upper end of the crank arm 319 secured to a rock shaft 320. This rock shaft is in turn operated by means of a crank 321 operated by means of an eccentric rod 322 coöperating with an eccentric 323 on the main shaft 40. Thus, the knife is reciprocated continuously during the rotations of the main shaft and all of the fabrics are simultaneously trimmed at their ends to the length predetermined by the particular adjustment of the trimmer frame upon the longitudinal rod 313.

As hereinbefore stated, provision is also made for crushing the fabrics near their rearward ends in order to prevent the relative displacement of the series of coils in the handling of the fabrics. For this purpose, I arrange mechanism which, in the present case, crushes the coils of the fabrics at a point near their rearward ends, which mechanism operates just prior to the trimming operation. As shown in Fig. 27, I pivot upon the trimmer frame a series of bell crank levers 324, whose lower arms are pivotally connected to the reciprocating knife or trimmer while the other arms thereof which are substantially horizontal, are inclined at their outer ends and arranged in proximity to the inclined faces of the guide extensions 325 of the trimmer frame. In the reciprocation of the knife or trimmer, the horizontal arms of the bell cranks 324 are moved toward and away from the guides 325 and serve to crush the coils of the fabrics interposed therebetween, after which the fabrics pass downward and are trimmed by the trimmers as hereinbefore explained.

In the present embodiment of my invention I provide means for receiving the fabrics as they are woven and for moving the same upwardly as they are ejected from the weaving channels. In the present instance these means comprise a series of longitudinal rolls 326, one for each weaving channel and arranged substantially thereabove and at a slight distance away and I provide suitable operating connections for intermittently rotating these rolls at proper times, such rolls being provided along their length with teeth or points for engaging the fabric. In the general views, Figs. 1 to 4, only one of these rolls is illustrated, the others having been removed for the purpose of exposing the parts below. Referring to these particular figures and also to Figs. 35, 36 and 37, these rolls are journaled in end bearings 327 projecting upwardly from the top plane of the main frame of the machine. The rearward ends of these rolls are provided with sprocket wheels 328 which have frictional connection with their rolls, as hereinafter described, and are arranged to be driven by a common sprocket chain 329, which, in the present instance, is itself driven in the following manner. A driving sprocket wheel 330 is mounted at one side of the machine frame and provided with a ratchet wheel 331 on whose shaft 332 is loosely pivoted an oscillating pawl carrier 333. On the inner side of this pawl carrier is pivoted a pawl 334 adapted to engage the ratchet wheel and to drive the latter whenever its carrier is oscillated. This pawl carrier is operatively connected at its lower end with the upper end of a rock arm or lever 335 pivoted intermediate its length. The lower end of this lever is pivotally connected with one end of an arm 336, whose other end is formed as an eccentric strap encircling an eccentric 337 which is secured upon the rearward end of the shaft 173. It will thus be seen that upon the step by step rotation of the shaft 173 the driving sprocket wheel 330 will be given a partial rotation which will be communicated by means of the sprocket chain to all of the series of sprocket wheels 328, with the result that the fabrics on the rolls 326 will be fed upwardly from the weaving channels and thence downwardly through the machine frame and past the knife or trimmer hereinbefore described.

By preference, as hereinbefore referred to, each sprocket wheel 328 has a frictional connection with its roll, a suitable construction to this end being illustrated in Figs. 35 and 36. As shown, the roll is provided with a bearing spindle 338 which is extended beyond its bearing 327 and secured at its outer end to a flanged hub or sleeve 339. The sprocket wheel 328 fits upon the sleeve and the same is pressed inwardly or forwardly against the flange of the sleeve 339 with a yielding pressure by means of a spring 340, whose tension is adjustable by means of the nut 341 screwing upon the outer end of the hub. This spring bears at its inner end against the friction ring 342, a separate ring 343 being preferably interposed between the ring 342 and the sprocket wheel 328. The roll shafts are thus in fact driven by friction and the slipping of the sprockets 328 serves to take up any surplus of movement, thereby preventing the fabric from being pulled out from the clamp formed by the shutters in the weaving channel or wire way.

The operating bars 132 of the retaining shutters are operated in unison by the members 166 and 170 between which is arranged a yielding device, so that when the cords are being run all of the retaining shutters are prevented from moving across the channel their full distance as usual, inasmuch as a part of the movement is taken up by said yielding device. However, with respect to the ejecting shutters while a similar yielding device may be employed between the two operating connections or members 182 and 183, yet it is desirable and preferable to make provision for independent yielding devices in the separate connections which extend to the operating bars 133. To this end, as illustrated in detail in Figs. 35 and 52, the connection between each bar 133 and its operating arm is made in two portions, the main portion 183 and another portion 344, the former being pivotally connected to the operating bar 132 and the latter portion being hooked over a pin 345 projecting laterally from its operating arm 182. The two portions 183 and 344 are connected together with a yielding connection which, in the present instance, is constructed as follows. The outer end of the portion or link 183 has a central bore to form a sleeve arranged to receive the inwardly projecting stem of the portion or rod 344, as indicated in Fig. 52. The outer end of the link 183 is also screw threaded to receive an adjustable nut 346 which constitutes the outer abutment for a coiled spring 347 encircling the link 183 and bearing against a flanged collar 348 sleeved upon the link 183. This collar is provided with a transverse pin 349 which also passes through longitudinal slots 350 in the side walls of the sleeve portion of the link 183. The result of this arrangement is that ordinarily in the regular weaving operations each ejecting shutter is moved its regular distance, the pressure or movement of the rod or connection 344 being transmitted to the link 183 through the medium of the spring 347 and the collar 348. When, however, a cord is being run in the fabric, at which time the ejecting shutters meet with some resistance from the wire coils and when the rod 344 is rocked outwardly to the left in Fig. 52, the resulting excess pressure of the connections 344 is taken up by the spring 347, it being understood that as the link 183 which is subject to this resistance, does not move outwardly freely as before, the continued outward movement of the member or rod 344 carries the pin 345 outwardly in the slot, the abutment or adjusting nut 346 remaining stationary while the spring becomes compressed to the extent of the independent movement between the members 183 and 344. The degree of this independent movement or in other words the degree of pressure which may be resisted by the link 183 is adjustable by the nut 346. Inasmuch as each of the operating bars 133 is provided with a separate and similar yielding connection which is adjustable, it is obvious that the yielding resistance or pressure which may be applied to the bars 133 may be independently adjusted in order to bring about the proper operation of each of the ejecting shutters.

For the purpose of suspending the operation of the weaving devices and thereby causing a series of coils to be run together in the weaving channels for any purpose desired, as for instance, for testing the coilers and their uniformity of action, suitable means may be provided for holding two slides 216 and 236 and thereby rendering the weaving devices inoperative and the trigger mechanism continuously operative, thereby enabling a series of coils to be run together, I provide an arm 351 pivoted at its lower end to the bracket 217 and having a projection arranged to be swung in the path of movement of a stud 352 projecting from the outer face of the slide 216, with the result that such slide will be held in its upward position in the same manner that it is held by the pivoted arm 231. This arm 351 is, of course, manually operated and may be kept in engagement with said stud as long as required by the operator.

I claim:

1. In a coiled wire fabric machine, the combination, with the coiling devices, of a pair of feed rolls for feeding the wire thereto, one of said rolls comprising a shaft and a removable collar or ring mounted thereon and positively rotated by its shaft, and the other of said rolls comprising a shaft and a ring surrounding its shaft and having a flexible driving connection therewith.

2. In a coiled wire fabric machine, the combination, with the coiling devices, of a pair of feed rolls for feeding the wire thereto, one of said rolls comprising a shaft and a plurality of collars or rings mounted thereon parallel to each other and positively rotated thereby, and the other of said rolls comprising a shaft and a plurality of rings with flexible driving connections with their shaft.

3. In a coiled wire fabric machine, the combination, with the coiling devices, of a pair of feed rolls for feeding the wire thereto, one of said rolls comprising a shaft, a plurality of removable collars or rings mounted thereon, and distance pieces between the collars.

4. In a coiled wire fabric machine, the combination, with the coiling devices, of a pair of feed rolls for feeding the wire thereto, one of said rolls comprising a shaft, a plurality of pairs of collars or rings mounted thereon, distance disks on the shaft between the members of the pairs of collars, and sleeves on the shaft between the pairs of collars.

5. In a coiled wire fabric machine, the combination, with the coiling devices, of a pair of feed rolls for feeding the wire thereto, one of said rolls comprising a shaft, a disk mounted on and driven by the shaft, and a collar surrounding the disk and constituting the wire feeding surface of its roll, and the other roll comprising a shaft and a ring constituting the wire feeding surface of such roll, said ring having a flexible driving connection with the shaft.

6. In a coiled wire fabric machine, the combination, with the coiling devices, of a pair of feed rolls for feeding the wire thereto, one of said rolls comprising a shaft, a disk mounted on and driven by the shaft, and a collar surrounding the disk and removably secured thereto, and the other roll comprising a shaft and a ring surrounding it, such ring constituting the wire feeding surface of its roll and having a flexible driving connection with its shaft.

7. In a coiled wire fabric machine, the combination, with the coiling devices, of a pair of feed rolls for feeding the wire thereto, one of said rolls comprising a shaft, a plurality of disks mounted on and positively driven by their shaft, collars surrounding the disks and constituting the wire feeding surfaces of such roll and distance disks on the shaft between the members of the pairs of collars and sleeves on the shaft between the pairs of collars.

8. In a coiled wire fabric machine, the combination, with the coiling devices, of a pair of feed rolls for feeding the wire thereto, one of said rolls comprising a shaft, a plurality of collars or rings arranged in pairs, disks mounted on and driven by the shaft and carrying the collars on their periphery to form the wire feeding surfaces of such roll, distance sleeves between the members of each pair of collars and between the pairs of collars.

9. In a coiled wire fabric machine, the combination, with the coiling devices, of a pair of feed rolls for feeding the wire thereto, the pressure surface of one of the rolls having a yielding connection with its driving shaft, and the wire feeding surface of the other roll comprising a removable ring or collar positively driven by its shaft.

10. In a coiled wire fabric machine, the combination, with the coiling devices, of a pair of feed rolls for feeding the wire thereto, the pressure surface of one of the rolls being in the form of a ring or collar having a yielding operating connection with its shaft, and the surface of the other roll comprising a removable ring or collar positively driven by its shaft.

11. In a coiled wire fabric machine, the combination, with the coiling devices, of a pair of feed rolls for feeding the wire thereto, the pressure surface of one of the rolls being in the form of a ring or collar having a yielding operating connection with its shaft and a ring or collar removably mounted on the other feed roll.

12. In a coiled wire fabric machine, the combination, with the coiling devices, of a pair of feed rolls for feeding the wires thereto, the pressure surface of one of the rolls being in the form of a ring or collar having a yielding operating connection with its shaft, and a ring or collar of the same diameter of the first mentioned collar and removably mounted on the other feed roll, said last mentioned collar being positively driven by such roll.

13. In a coiled wire fabric machine, the combination, with coiling devices, of a pair of feed rolls for feeding the wire thereto, and means for intermittently moving the wire feeding surface of one roll towards that of the other with a yielding pressure and eccentric to the axis of its roll.

14. In a coiled wire fabric machine, the combination, with coiling devices, of a pair of feed rolls for feeding the wire thereto, and means for intermittently moving the wire feeding surface of one roll towards that of the other with a yielding pressure, adjustable in degree and eccentric to the axis of its roll.

15. In a coiled wire fabric machine, the combination, with coiling devices, of a pair of continuously operating feed rolls for feeding the wire thereto, and means for moving the wire feeding surface of one roll towards that of the other with a yielding pressure and eccentric to the axis of its roll.

16. In a coiled wire fabric machine, the combination, with coiling devices, of a pair of continuously operating feed rolls for feeding the wire thereto, and having shafts having a fixed working relation, and means for moving the wire feeding surface of one roll towards that of the other with a yielding pressure and eccentric to the axis of its roll.

17. In a coiled wire fabric machine, the combination, with coiling devices, of a pair of feed rolls for feeding the wire thereto, the pressure surface of one of the rolls being arranged to be moved eccentric of its shaft to a feeding position, and intermittently operated means for so moving the pressure surface and eccentric to the axis of its roll.

18. In a coiled wire fabric machine, the combination, with coiling devices, of a pair of feed rolls for feeding the wire thereto, the pressure surface of one of the rolls being arranged to be moved eccentric of its shaft to a feeding position, and intermittently actuated means for so moving the pressure surface for an intermittent feed of the wire, said feed rolls being continuously running and eccentric to the axis of its roll.

19. In a coiled wire fabric machine, the combination, with coiling devices, of a pair of feed rolls for feeding the wire thereto, the pressure surface of one of the rolls being arranged to be moved eccentric of its shaft to a feeding position, and having a yielding driving connection with its shaft, and means for so moving the pressure surface intermittently.

20. In a coiled wire fabric machine, the combination, with coiling devices, of a pair of feed rolls for feeding the wire thereto, the pressure surface of one of the rolls being arranged to be moved eccentric of its shaft to a feeding position, and yielding means for so moving the pressure surface intermittently.

21. In a coiled wire fabric machine, the combination, with coiling devices, of a pair of feed rolls for feeding the wire thereto, the pressure surface of one of the rolls being arranged to be moved eccentric of its shaft to a feeding position, and spring pressed mechanism for intermittently exerting pressure on such surface and moving the same eccentric of its shaft for feeding the wire.

22. In a coiled wire fabric machine, the combination, with coiling devices, of a pair of feed rolls for feeding the wire thereto, the pressure surface of one of the rolls being arranged to be moved eccentric of its shaft to a feeding position, and intermittently operated spring pressed mechanism for intermittently exerting pressure on such surface and moving the same eccentric of its shaft for feeding the wire.

23. In a coiled wire fabric machine, the combination, with coiling devices, of a pair of feed rolls for feeding the wire thereto, the pressure surface of one of the rolls being arranged to be moved eccentric of its shaft to a feeding position, and spring pressed mechanism for so moving the pressure surface intermittently, said spring pressure being adjustable in degree.

24. In a coiled wire fabric machine, the combination, with coiling devices, of a pair of feed rolls for feeding the wire thereto, the pressure surface of one of the rolls being arranged to be moved eccentric of its shaft to a feeding position, and comprising a ring or collar having a yielding combination with its shaft, and intermittently operated means for so moving the collar intermittently eccentric of its shaft for feeding the wire.

25. In a coiled wire fabric machine, the combination, with coiling devices, of a pair of feed rolls for feeding the wire thereto, the pressure surface of one of the rolls being arranged to be moved eccentric of its shaft to a feeding position, and comprising a ring or collar encircling its shaft and having a spring driving connection therewith, and an intermittently operated roller arranged to bear against the ring or collar and move it in its eccentric feeding position.

26. In a coiled wire fabric machine, the combination, with coiling devices, of a pair of feed rolls for feeding the wire thereto, the pressure surface of one of the rolls being arranged to be moved eccentric of its shaft to a feeding position, and comprising a ring or collar encircling its shaft and having a spring driving connection therewith, and an intermittently operated spring pressed roller arranged to bear against the ring or collar and move it in its eccentric feeding position.

27. In a coiled wire fabric machine, the combination, with coiling devices, of a pair of feed rolls for feeding the wire thereto, the pressure surface of one of the rolls being arranged to be moved eccentric of its shaft to a feeding position, and comprising a ring or collar encircling its shaft and having a spring driving connection therewith, an intermittently operated spring pressed pressure roller arranged to bear against the ring or collar and move it in its eccentric feeding position, and means for adjusting the tension of the spring of such roller.

28. In a coiled wire fabric machine, the combination, with coiling devices, of a pair of feed rolls for feeding the wire thereto, the pressure surface of one of the rolls being arranged to be moved eccentric of its shaft to a feeding position, and comprising a ring or collar encircling its shaft and having a spring driving connection therewith, a pair of rollers arranged to bear against the ring or collar, a movable frame or cradle for such rollers, and means for intermittently reciprocating the frame to cause its rollers to intermittently move the ring to eccentric feeding position.

29. In a coiled wire fabric machine, the combination, with coiling devices, of a pair of feed rolls for feeding the wire thereto, the pressure surface of one of the rolls being arranged to be moved eccentric of its shaft to a feeding position, and comprising a ring or collar encircling its shaft and having a spring driving connection therewith, a pair of rollers arranged to bear against the ring or collar, a movable spring pressed frame or cradle for such rollers, and means for intermittently reciprocating the frame to cause its rollers to intermittently move the ring to eccentric feeding position.

30. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, and a corresponding plurality of intermittently operated means for applying pressure to said surfaces and displacing them to a position eccentric of said shaft.

31. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces, and means for moving said rollers against their pressure surfaces.

32. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces to move the latter eccentric of their shaft for wire feeding, and means for so moving the rollers intermittently and in unison.

33. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces to move the latter eccentric of their shaft for wire feeding, means for so moving the rollers, and means for regulating the tension or pressure capable of being exerted by such rollers.

34. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces to move the latter eccentric of their shaft for wire feeding, means for so moving the rollers, and means for regulating the pressure capable of being exerted by such rollers independently.

35. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces to move the latter eccentric of their shaft for wire feeding, means for so moving the rollers, and means for rendering any one of the rollers inactive at the will of the operator.

36. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces to move the latter eccentric of their shaft for wire feeding, an operating connection, springs interposed between said connection and the rollers for transmitting motion, and means interrupting such transmitting connection at the will of the operator.

37. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces to move the latter eccentric of their shaft for wire feeding, an operating connection, springs interposed between said connection and the rollers for transmitting motion, and means for taking the thrust on said springs and relieving the rollers of pressure.

38. In a coiled wire fabric machine, the combination, with a plurality of coiling devices, of a pair of continually running feed rolls for feeding the wire thereto, one of the rolls having a plurality of pressure surfaces with a yielding driving connection with the shaft of their roll, a corresponding plurality of pressure rollers coöperating with the pressure surfaces to move the latter eccentric of their shaft for wire feeding, an operating connection, springs interposed between said connection and the rollers for transmitting motion, and a series of independently operated keys for taking the thrust on said springs and relieving the rollers of pressure.

39. In a coiled wire fabric machine, the combination, with the coiling devices, of a pair of feed rolls for feeding the wire thereto, means for intermittently exerting a yielding pressure against one of the rolls, and means for preventing the action of such pressure on the roll at the will of the operator.

40. In a coiled wire fabric machine, the combination, with the coiling devices, of a pair of feed rolls for feeding the wire thereto, means for intermittently exerting a yielding pressure against one of the rolls, and a key for preventing the action of such yielding pressure at the will of the operator.

41. In a coiled wire fabric machine, the combination, with the coiling devices, of a pair of feed rolls for feeding the wire thereto, means for intermittently exerting a yielding pressure against one of the rolls, and a manually operated device for preventing the action of such yielding pressure at the will of the operator.

42. In a coiled wire fabric machine, the combination, with the coiling devices, of a pair of feed rolls for feeding the wire thereto, means for intermittently exerting a yielding pressure against one of the rolls, said rolls having a plurality of wire feeding surfaces to accommodate a plurality of coiling devices, and means for preventing the action of such yielding pressure in respect to any one or all of the sets of coiling devices.

43. In a coiled wire fabric machine, the combination, with the coiling devices, of a pair of feed rolls for feeding the wire thereto, means for intermittently exerting a yielding pressure against one of the rolls, said rolls having a plurality of wire feeding surfaces to accommodate a plurality of coiling devices, and a series of independently operable keys for preventing the action of such yielding pressure in respect to any one or all of the sets of coiling devices.

44. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface to move it to said position, a movable frame for said roller, a reciprocating bar, and a spring connection between such bar and the frame.

45. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface to move it to said position, a movable frame for said roller, a reciprocating bar, a spring connection between such bar and the frame, and means for adjusting the tension of such spring.

46. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface to move it to said position, a movable frame for said roller, a reciprocating bar having a bore partway of its length, and a spring arranged within the bore of the bar and adapted to transmit the movement of the bar to the frame.

47. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface to move it to said position, a movable frame for said roller, a reciprocating bar having a bore partway of its length, an adjusting screw in the inner end of such bore, and a spring arranged within the bore of the bar and bearing against said screw which regulates the tension thereof, said spring being adapted to transmit the movement of the bar to the frame.

48. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface, to move it to said position, a movable frame for said roller, a reciprocating bar having a bore partway of its length, a spring arranged within said bore, and a plunger or pin sliding in the bore and outwardly pressed by said spring, said plunger exerting pressure against said frame when the bar is operated.

49. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface to move it to said position, a movable frame for said roller, a reciprocating bar having a bore partway of its length, a spring arranged within said bore, and a plunger or pin sliding in the bore and outwardly pressed by said spring, and a bearing plate interposed between the plunger and frame whereby the movement of the bar is transmitted to the latter through the spring and plunger.

50. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface, to move it to said position, a movable frame for said roller, a reciprocating bar having a bore partway of its length, a spring arranged within said bore, and a plunger or pin sliding in the bore and outwardly pressed by said spring, and means for receiving the pressure exerted by the plunger when the bar is operated and thereby preventing movement of said frame.

51. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface, to move it to said position, a movable frame for said roller, a reciprocating bar having a bore partway of its length, a spring arranged within said bore, and a plunger or pin sliding in the bore and outwardly pressed by said spring, and a key arranged to be inserted adjacent the plunger and to receive the pressure exerted by the plunger when the bar is operated and thereby prevent movement of said frame.

52. In a coiled wire fabric machine, the combination, with the coiling devices, of a pair of feed rolls for feeding the wire thereto, one of the rolls having a yielding pressure surface movable to a position eccentric of its shaft, a pressure roller arranged to bear against such surface, to move it to said position, a movable frame for said roller, a reciprocating bar having a bore partway of its length, a spring arranged within said bore, and a plunger or pin sliding in the bore and outwardly pressed by said spring, a bearing plate interposed between the plunger and frame whereby the movement of the bar is transmitted to the latter through the spring and plunger, and a key arranged to be inserted above the bearing plate to prevent upward movement thereof and of the frame when the bar is reciprocated.

53. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a fulcrum bar on which the frames are pivoted, a reciprocating bar, and a spring connection between the latter bar and the fulcrum bar.

54. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a fulcrum bar on which the frames are pivoted, a single reciprocating bar, for both frames, a fulcrum pin for supporting and moving the bar, and a reciprocating bar having a spring operating connection with the fulcrum pin.

55. In a coiled wire fabric machine, the combination with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a fulcrum bar on which the frames are pivoted, a reciprocating bar, a spring connection between the latter bar and the fulcrum bar, and means for holding the fulcrum bar stationary at the will of the operator when the reciprocating bar is operated.

56. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a fulcrum bar on which the frames are pivoted, a reciprocating bar, a spring connection between the latter bar and the fulcrum bar, and a key or pin arranged to be interposed in the path of movement of the fulcrum bar to prevent the movement of the latter and of the frames when the reciprocating bar is operated.

57. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, means for moving the frames with a yielding pressure adjustable with respect to the individual frames.

58. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, means for moving the frames, and means for transmitting the pressure thereto differentially as applied to the two frames.

59. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, means for moving the frames, and means for transmitting the pressure thereto differentially in respect to the same and to an adjustable degree.

60. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a fulcrum bar on which the frames are pivoted, and a movable pin or plunger supporting the fulcrum bar and adjustable together with the latter to vary the pivotal points of the frames thereon.

61. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a fulcrum bar on which the frames are pivoted, a movable pin or plunger supporting the fulcrum bar, and a bracket supporting the pin, said bracket being adjustable laterally together with the fulcrum bar and pin to vary the pivotal points of the frames.

62. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a reciprocating bar having a bore in which the pin moves, a spring in the bore to operatively connect the reciprocating bar with the pin, and a bracket in which the latter bar reciprocates, said bracket being adjustable together with its bar and pin and fulcrum bar to vary the pivotal points of the frames.

63. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a sliding bar, yielding operating connections between such bar and the frames or cradles, and an operating bar having a cam arranged to operate the sliding bar.

64. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a sliding bar having a cam roller, yielding operating connections between such bar and the frames or cradles, and an operating bar having a cam arranged to coöperate with the cam roller and thereby actuate its sliding bar.

65. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a sliding bar, yielding operating connections between such bar and the frames or cradles, an operating bar, and a cam mounted thereon to operate the sliding bar and adjustable to time the movement of the latter.

66. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a sliding bar, yielding operating connections between such bar and the frames or cradles, an operating bar, and a cam mounted on but adjustable independently of the operating bar for actuating the sliding bar.

67. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a sliding bar, yielding operating connections between such bar and the frames or cradles, an operating bar, a cam thereon for actuating the sliding bar, and means for moving the cam independently of its bar for reciprocating the sliding bar at the will of the operator.

68. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a sliding bar, yielding operating connections between such bar and the frames or cradles, an operating bar, a cam thereon for actuating the sliding bar, and means for adjusting the cam on its bar and for holding it adjusted.

69. In a coiled wire fabric machine, the combination, with the coiling devices, of feed rolls for feeding the wire thereto, the pressure surface of one of the rolls consisting of a pair of rings or collars yieldingly connected with their driving shaft, pressure applying rollers for the pressure rings, a corresponding pair of frames or cradles in which the rollers are mounted, a sliding bar, yielding operating connections between such bar and the frames or cradles, an operating bar, a cam thereon for actuating the sliding bar and provided with rack teeth, and a manually operated pinion engaging said rack teeth for reciprocating the cam.

70. In a coiled wire fabric machine, the combination of the coiling devices, a reciprocating head, a frame supported by said head, and cut-off mechanism mounted in said frame and adjustable toward and away from the coiling devices.

71. In a coiled wire fabric machine, the combination of the coiling devices, a reciprocating head, a frame supported by said head and adjustable therein, and cut-off mechanism mounted in said adjustable frame and being itself adjustable in such frame.

72. In a coiled wire fabric machine, the combination, with the coiling device, of a frame arranged adjacent said coiling device, and adjustable towards and away from such device, and a knife or cutter mounted in said frame for cutting off the wire.

73. In a coiled wire fabric machine, the combination, with a plurality of coiling devices, of a frame adjustable towards and away from the coiling devices, and a series of knives corresponding to the coiling devices and mounted in and adjustable with said frame.

74. In a coiled wire fabric machine, the combination, with the coiling device, of a movable trigger or arm arranged to engage and position the coil during the cording operation, and means for adjusting the position of such arm.

75. In a coiled wire fabric machine, the combination, with the coiling device, of a movable trigger or arm arranged to engage and position the coil during the cording operation, and an adjustable frame in which said arm is mounted.

76. In a coiled wire fabric machine, the combination, with the coiling device, of a movable trigger or arm arranged to engage and position the coil during the cording operation, a frame in which said arm is mounted, and means for adjusting the position of the frame comprising worm gears mounted in opposite sides of such frame, and an operating shaft having worms engaging such worm gears.

77. In a coiled wire fabric machine, the combination, with the coiling device, of a movable trigger or arm arranged to engage and position the coil during the cording operation, cut-off mechanism for cutting the wires after being coiled, and means for adjusting the arm to operate closer to or further away from the cut-off mechanism.

78. In a coiled wire fabric machine, the combination, with the coiling device, of a movable trigger or arm arranged to engage and position the coil during the cording operation, and cut-off mechanism for cutting the wires after being coiled and adjustable in respect to the coiling device, said arm being also adjustable in respect thereto.

79. In a coiled wire fabric machine, the combination, with the coiling device, of a movable trigger or arm arranged to engage and position the coil during the cording operation, and cut-off mechanism for cutting the wires after being coiled, said cut-off mechanism and said arm being independently adjustable with respect to the coiling device and in respect to each other.

80. In a coiled wire fabric machine, the combination, with the coiling device, of a movable trigger or arm arranged to engage and position the coil during the cording operation, cut-off mechanism for cutting the wires after being coiled, a frame carrying such mechanism, and means similar to the first named adjusting means for adjusting the position of such mechanism closer to or further away from the coiling device.

81. In a coiled wire fabric machine, the combination, with the coiling device, of a movable positioning and retaining finger arranged to first hold the coil after being coiled and to then move the coil rearwardly slightly away from the coiling device.

82. In a coiled wire fabric machine, the combination, with the coiling device, of a movable positioning or retaining finger having an inclined rearward edge presented to the coil near its last coiled end and arranged to retain the rearward end thereof and to also slightly move the same away from the coiling device.

83. In a coiled wire fabric machine, the combination, with the coiling device, of a movable positioning and retaining finger arranged to engage the coil in the cording operation, to hold the same and to then move it rearwardly to position it, said finger being adjustable towards and away from the coiling device.

84. In a coiled wire fabric machine, the combination, with the coiling device and cut-off mechanism, of a movable positioning and retaining finger arranged to engage the coil in the cording operation, said finger being adjustable towards and away from the cut-off mechanism.

85. In a coiled wire fabric machine, the combination, with the coiling device and cut-off mechanism, of a movable positioning or retaining finger arranged to engage the coil in the cording operation, means for adjusting the relative positions of the cut-off mechanism and said finger.

86. In a coiled wire fabric machine, the combination, with the coiling device and cut-off mechanism, of a movable retaining finger arranged to engage the coil in the cording operation, separate frames carrying the finger and the cut-off mechanism, and means for adjusting said frames independently.

87. In a coiled wire fabric machine, the combination, with the coiling device and cut-off mechanism, of a movable retaining finger arranged to engage the coil in the cording operation, and a trigger or arm arranged to engage and move an end of the coil towards the cut-off mechanism in the cording operation, said cut-off mechanism, finger, and arm being independently adjustable in respect to each other and to the coiling device.

88. In a coiled wire fabric machine, the combination, with the coiling device, of a trigger or arm adapted to engage a coil in the cording operation, a pair of rock shafts, means for rocking said shafts, and connecting links between said shafts and trigger for imparting to the latter downward, rearward, upward, and forward movements.

89. In a coiled wire fabric machine, the combination, with the coiler, of a tensioner therefor comprising a cylinder mounted in advance of the coiler and having a spiral to coöperate with that of said coiler, and means for rotarily adjusting the cylinder comprising a gear operatively connected with the cylinder, and a pinion engaging said gear.

90. In a coiled wire fabric machine, the combination, with the coiler, of a tensioner therefor comprising a cylinder mounted in advance of the coiler and having a spiral to coöperate with that of said coiler, a shell secured to and surrounding the cylinder, a gear secured to the shell, and a pinion engaging the gear.

91. In a coiled wire fabric machine, the combination, with the coiler, of a tensioner therefor comprising a cylinder mounted in advance of the coiler and having a spiral to coöperate with that of said coiler, a shell secured to and surrounding the cylinder, a supporting plate having a groove partially receiving the shell, a worm gear on the shell, and a worm engaging and actuating the worm gear.

92. In a coiled wire fabric machine, the combination, with a wire coiling device, of a weaving device comprising two parallel bars or strips forming a channel between them, one of which is movable and the other stationary, a series of yokes arranged at intervals along the length of the strips to receive both of them but secured to the stationary strip only, and means for adjusting the relative position of the movable strip to adjust the width of the channel.

93. In a coiled wire fabric machine, the combination, with a wire coiling device, of a weaving device comprising two parallel bars or strips, forming a channel between them, one of which is movable and the other stationary, a series of yokes arranged at intervals along the length of the strips to receive both of them but secured to the stationary strip only, and removable fillets arranged between the movable strip and the yokes, the removal of which fillets permitting the channel to be widened.

94. In a coiled wire fabric machine, the combination, with a wire coiling device, of a weaving device comprising two parallel bars or strips, forming a channel between them, one of which is movable and the other stationary, a series of yokes arranged at intervals along the length of the strips to receive both of them but secured to the stationary strip only, magnet-supporting blocks connected with the yokes, and an electro-magnet arranged in the channel and supported by the blocks.

95. In a coiled wire fabric machine, the combination, with a wire coiling device, of a weaving device comprising two parallel bars or strips, forming a channel between them, one of which is movable and the other stationary, a series of yokes arranged at intervals along the length of the strips to receive both of them but secured to the stationary strip only, a plate arranged upon the inner side of the stationary strip to form thereat a removable wear plate, said plate being of non-magnetic material, blocks connected with the yokes, and an electro-magnet supported by such blocks.

96. In a coiled wire fabric machine, the combination, with a wire coiling device, of a weaving device comprising two parallel bars or strips, forming a channel between them, one of which is movable and the other stationary, a series of yokes arranged at intervals along the length of the strips to receive both of them but secured to the stationary strip only, a removable plate arranged upon the inner side of the stationary strip to form thereat a wear plate, blocks connected with the yokes and arranged between the bars or strips, and an electro-magnet supported by such blocks.

97. In a coiled wire fabric machine, the combination therewith of the wire reels, and means interposed between the machine and the reels for catching a knot or the like in the wire and automatically stopping the machine when a wire thus becomes caught and for supplying sufficient wire to complete the coil of the particular wire caught or knotted.

98. In a coiled wire fabric machine, the combination therewith of the wire reels, a pulley or sheave over which the wire runs from the reel to the machine and which is suspended with a yielding pressure, said pressure being overcome when a wire is caught or knotted, and an electrical device actuated by the falling sheave for stopping the machine.

99. In a coiled wire fabric machine, the combination therewith of the wire reels, a pulley or sheave over which the wire runs from the reel to the machine and which is suspended with a yielding pressure, said pressure being overcome when a wire is caught or knotted, means for predetermining the amount of such pressure, and an electrical device actuated by the falling sheave for stopping the machine.

100. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm near whose upper end the sheave is so held and on which it is arranged to slide when falling, and an electrical device actuated by the falling sheave for stopping the machine.

101. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, means for holding said sheave in the upper end of the slot with a yielding pressure, and an electrical device actuated by the falling sheave for stopping the machine.

102. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring pressed arm coöperating with said spindle to hold the sheave in its elevated position in said slot with a yielding pressure, and an electrical device actuated by the falling sheave for stopping the machine.

103. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring pressed arm having an inclined portion engaging said spindle to hold the sheave in elevated position in the slot with a yielding pressure, and an electrical device actuated by the falling sheave for stopping the machine.

104. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring-pressed arm arranged to engage said spindle to hold the sheave in elevated position in the slot with a yielding pressure, means for predetermining or adjusting such spring pressure, and an electrical device actuated by the falling sheave for stopping the machine.

105. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring-pressed arm arranged to engage the spindle to hold the sheave in elevated position in the slot with a yielding pressure, an electrical device actuated by the falling sheave for stopping the machine, and a spool through which the wire passes from the reel to said sheave and which is arranged to catch a knot or the like and stop the feed of wire and also cause tension of the wire upon the sheave.

106. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring-pressed arm arranged to engage the spindle to hold the sheave in elevated position in the slot with a yielding pressure, an electrical device actuated by the falling sheave for stopping the machine, a second sheave between the first sheave and the reel, and a spool which is arranged on the reel side of the second sheave and through which the wire passes.

107. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring-pressed arm arranged to engage the spindle to hold the sheave in elevated position in the slot with a yielding pressure, an electrical device actuated by the falling sheave for stopping the machine, and another sheave arranged towards the lower end of said slotted arm.

108. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring-pressed arm arranged to engage the spindle to hold the sheave in elevated position in the slot with a yielding pressure, an electrical device actuated by the falling sheave for stopping the machine, a support having a bracket on which the slotted arm is mounted, and another sheave mounted on said bracket and over which the wire passes on its way to the machine.

109. In a coiled wire fabric machine, the combination therewith of the wire reels, a pulley or sheave over which the wire runs from the reel to the machine and which is suspended with a yielding pressure, said pressure being overcome when a wire is caught or knotted, an upright arm having a longitudinal slot arranged to receive the spindle of the sheave, a spring-pressed arm arranged to engage the spindle to hold the sheave in elevated position in the slot with a yielding pressure, an electrical device actuated by the falling sheave for stopping the machine, a support having a bracket on which the slotted arm is mounted, and a second sheave carried at the upper end of said support and arranged between the first sheave and the reel.

110. In a coiled wire fabric machine, the combination therewith of the wire reels, a pair of sheaves over which the wires run and which are held suspended with a yielding pressure, but arranged to fall when the tension of the wires exceeds normal, a pair of stationarily arranged sheaves over which the wires run from the first sheaves to the machine, and an electrical device actuated by either one of the falling sheaves for stopping the machine.

111. In a coiled wire fabric machine, the combination therewith of the wire reels, a vertical support, a pair of sheaves at the upper end of such support and over which the wires run, spools arranged on the reel side of the sheaves, a bracket on said support, a pair of sheaves mounted on the bracket and over which the wires pass on their way to the machine, an upright arm rising from said bracket, a pair of sheaves held suspended on said arm with a yielding pressure resisting a normal wire pull or tension but arranged to fall when such tension is exceeded, and an electrical device actuated by either one of the falling sheaves for stopping the machine.

112. In a coiled wire fabric machine, the combination thereof with the wire reels, of a plurality of sheaves held suspended with a yielding pressure and arranged to fall upon an abnormal wire tension, and a series of guide sheaves arranged immediately in front of the machine.

113. In a coiled wire fabric machine, the combination, with a wire coiling device, of a weaving device comprising adjustable parallel side members forming a channel between them adjustable in width for different diameters of coils.

114. In a coiled wire fabric machine, the combination, with a wire coiling device, of a weaving device comprising parallel side members forming a weaving channel between them, and means for adjusting the width of such channel for different diameters of coils.

115. In a coiled wire fabric machine, the combination, with a wire coiling device, of a weaving device comprising parallel side members forming a weaving channel between them, one of the members being adjustable to adjust the width of such channel for different diameters of coils.

116. In a coiled wire fabric machine, the combination, with a wire coiling device, of a weaving device comprising parallel side members forming a weaving channel between them, both of the members being adjustable to adjust the width of such channel for different diameters of coils.

117. In a coiled wire fabric machine, the combination, with a wire coiling device, of a weaving device comprising two parallel bars or strips, forming a channel between them, one of which is movable and the other stationary, a series of yokes arranged at intervals along the length of the strips to receive both of them but secured to the stationary strip only, means for adjusting the relative position of the movable strip in the yoke, and means for adjusting the yokes and stationary strip, whereby the width of the channel may be adjusted for different diameters of coils.

118. In a coiled wire fabric machine, the combination, with the coiling device, of a weaving device comprising two parallel longitudinal strips forming a weaving channel between them, one of the strips being stationary and the other movable in the weaving operation, and a laterally adjustable frame supporting the stationary strip.

119. In a coiled wire fabric machine, the combination, with the coiling device, of a weaving device comprising two parallel longitudinal strips forming a weaving channel between them, one of the strips being stationary and the other movable in the weaving operation, a laterally adjustable frame supporting the stationary strip, and means for correspondingly adjusting the movable strip.

120. In a coiled wire fabric machine, the combination, with the coiling device, of a weaving device comprising two parallel longitudinal strips forming a weaving channel between them, one of the strips being stationary, and the other movable in the weaving operation, and a series of yokes arranged along the length of the strips and secured to the stationary strip but only receiving the movable strip, a laterally adjustable frame supporting the stationary strip, and removable fillets arranged between an inner side of the yokes and the outer side of the movable strip.

121. In a coiled wire fabric machine, the combination, with the coiling device, of a weaving device comprising two parallel longitudinal strips forming a weaving channel between them, one of the strips being stationary, and the other movable in the weaving operation, and a series of yokes arranged along the length of the strips and secured to the stationary strip but only receiving the movable strip, laterally adjustable frames or plates supporting opposite ends of the stationary strips, and removable fillets arranged in the yokes for adjusting the relative position of the movable strips thereon.

122. In a coiled wire fabric machine, the combination, with the coiling device, of a weaving device comprising a channel in which the wires as coiled are run, shutters movable partially across the channel to coöperate with the fabric, and yielding operating connections coöperating with the shutters and arranged to yield when the cords are presented to the shutters.

123. In a coiled wire fabric machine, the combination, with the coiling device, of a weaving device comprising a channel in which the wires as coiled are run, shutters movable partially across the channel to coöperate with the fabric, operating connections for said shutters to move them in respect to the channel, and automatic means for determining the degree of such movement accordingly as the regular weave or cords are presented to the shutters.

124. In a coiled wire fabric machine, the combination, with the coiling device, of a weaving device comprising a channel in which the wires as coiled are run, shutters movable partially across the channel to coöperate with the fabric, a driving shaft, and operating connections between such shaft and the shutters and adapted to yield after a predetermined thrust is imparted to the shutters.

125. In a coiled wire fabric machine, the combination, with the coiling device, of a weaving device comprising a channel in which the wires as coiled are run, shutters movable partially across the channel to coöperate with the fabric, a driving shaft, and operating connections between such shaft and the shutters and having interposed springs adapted to yield after a predetermined thrust is imparted to the shutters.

126. In a coiled wire fabric machine, the combination, with the coiling and weaving devices, of a fixed plate arranged transversely of the machine and having an inclined slot receiving the rearward edge of the fabric as delivered from the machine, and a reciprocating knife movable across such slot to trim such edge of the fabric.

127. In a coiled wire fabric machine, the combination, with gangs of coiling and weaving devices, adapted to simultaneously produce a plurality of fabrics, of a trimmer common to all the fabrics and arranged in the path of the rearward edge of all the fabrics and adapted to simultaneously trim the same.

128. In a coiled wire fabric machine, the combination, with gangs of coiling and weaving devices, adapted to simultaneously produce a plurality of fabrics, of a fixed plate having a corresponding plurality of slots receiving the rearward edges of the fabrics, and a single reciprocating knife common to all the slots and movable thereacross to simultaneously trim such edges of all the fabrics.

129. In a coiled wire fabric machine, the combination, with the coiling and weaving devices, of a channel or guide in which the fabric passes, and a single movable member adapted to crush an edge of the fabric against such guide and also adapted to act as a knife to turn said edge of the fabric.

130. In a coiled wire fabric machine, the combination, with the coiling and weaving devices, of a channel or guide in which the fabric passes, and a bell crank, one of whose arms is arranged to crush an edge of the fabric against such guide.

131. In a coiled wire fabric machine, the combination, with the coiling and weaving devices, of a channel or guide in which the fabric passes, a reciprocating knife for trimming an edge of the fabric, and a movable member operatively connected with the knife and arranged to crush the fabric against such guide.

132. In a coiled wire fabric machine, the combination, with the coiling and weaving devices, of a channel or guide in which the fabric passes, a reciprocating knife for trimming an edge of the fabric, and a bell crank pivoted on a fixed axis, one arm of the bell crank being pivotally connected to the knife and the other arm being arranged to be moved to a position to crush the fabric against such guide.

133. In a coiled wire fabric machine, the combination, with coiling and weaving devices, of a pattern device determining the pattern or place of insertion of cords in the fabric, such pattern device comprising an endless band continuously operated in the operation of the machine and having means for causing the stopping of the weaving devices for the insertion of cords.

134. In a coiled wire fabric machine, the combination, with coiling and weaving devices, of a pattern device determining the pattern or place of insertion of cords in the fabric, and mechanism for operating the weaving devices, such pattern device comprising an endless band continuously operated in the operation of the machine, and an arm controlled by the band and, when permitted by the latter, arranged to stop said operating mechanism.

135. In a coiled wire fabric machine, the combination, with coiling and weaving devices, of a pattern device determining the pattern or place of insertion of cords in the fabric, and mechanism for operating the weaving devices, such pattern device comprising an endless band continuously operated in the operation of the machine, and an arm normally held with a yielding pressure towards a position to interfere with and stop the weaving devices, but restrained thereby until the time for the insertion of a cord.

136. In a coiled wire fabric machine, the combination, with coiling and weaving devices, of a pattern device determining the pattern or place of insertion of cords in the fabric, and mechanism for operating the weaving devices, such pattern device comprising an endless band continuously operated in the operation of the machine, and provided with a series of notches spaced at predetermined distances apart according to the desired type of fabric to be produced, and an arm coöperating with such notches and arranged to stop the weaving device when a notch is presented thereto.

137. In a coiled wire fabric machine, the combination, with coiling and weaving devices, of a pattern device determining the pattern or place of insertion of cords in the fabric, and mechanism for operating the weaving devices, such pattern device comprising an endless band continuously operated in the operation of the machine, and provided on one edge with a series of notches spaced according to the desired type of fabric to be produced, said band having a step by step movement, and an arm coöperating with such notches and controlling the operation of the weaving device, said arm being arranged to drop into any notch presented and thereby stop the weaving device.

138. In a coiled wire fabric machine, the combination, with coiling and weaving devices, of a pattern device determining the pattern or place of insertion of cords in the fabric, and mechanism for operating the weaving devices, such pattern device comprising an endless band continuously operated in the operation of the machine, and provided on one edge with a series of notches spaced according to the desired type of fabric to be produced and provided on the other edge with teeth corresponding to the number of weaves in the fabric, a pinion operated by the machine and engaging said teeth to move the band with a step by step movement, and an arm controlling the operation of the weaving device and itself controlled by the notches of the band.

139. In a coiled wire fabric machine, the combination, with coiling and weaving devices, of a pattern device determining the pattern or place of insertion of cords in the fabric, and mechanism for operating the weaving devices, such pattern device comprising an endless band continuously operated in the operation of the machine, and provided on one edge with a series of notches spaced according to the desired type of fabric to be produced and provided on the other edge with teeth corresponding to the number of weaves in the fabric, a pinion engaging said teeth, a pin wheel operated by the machine, and an arm controlling the operation of the weaving device and itself controlled by the notches of the band.

140. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a rachet and pawl, and means under the control of the band for rendering the pawl and ratchet machine inoperative when a cord is being run.

141. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run.

142. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run, such means comprising a slide having an arm which when the slide is stopped interferes with and swings the pawl to inactive position, and an arm governed by the band and arranged to stop said slide when a cord is to be run, as determined by the band.

143. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run, such means comprising a slide having an arm which when the slide is stopped and held suspended interferes with and swings the pawl to inactive position, and a device under the control of the band for holding the slide suspended when a cord is to be run, as determined by the band.

144. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run, such means comprising a slide spring pressed downwardly and having an arm which when the slide is held suspended interferes with and swings the pawl to inactive position, a cam for raising the slide against its spring pressure, and a device under the control of the band for holding the slide suspended when a cord is to be run, as determined by the band.

145. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run, such means comprising a slide spring pressed downwardly and having an arm which when the slide is held suspended interferes with and swings the pawl to inactive position, a cam for raising the slide against its spring pressure, said band having a series of notched spaces according to a predetermined pattern as regards cords in the fabric, and a spring pressed arm having a portion arranged to drop into any one of the notches as presented and having another portion arranged to thereupon move into the path of movement of the slide and thereby hold the same suspended.

146. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run, such means comprising a slide spring pressed downwardly and having an arm which when the slide is held suspended interferes with and swings the pawl to inactive position, a cam for raising the slide against its spring pressure, said band having on one edge a series of notches spaced according to a predetermined pattern as regards cords in the fabric, and a spring pressed arm having a tooth pressed against said edge of the band and adapted to drop into any one of the notches presented to thereby cause such arm to move to a position to interfere with the slide and hold it suspended.

147. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run such means comprising a slide spring pressed downwardly and having an arm which when the slide is held suspended interferes with and swings the pawl to inactive position, a cam for raising the slide against its spring pressure, a bracket for the slide having a flange provided with a hole, a pin arranged on the slide and adapted to normally enter said hole at every reciprocation of the slide, and an arm arranged to be interposed below the pin and prevent its entrance into said hole, but held restrained from such interfering position except when a cord is to be run as determined by the band.

148. In a coiled wire fabric machine, the combination, with coiling and weaving devices, of a pattern device determining the pattern or place of insertion of cords in the fabric, such pattern device comprising an endless band continuously operated in the operation of the machine, a train of mechanism for operating the weaving device and including a ratchet and pawl, and means under the control of the band for swinging the pawl to an inactive position when a cord is being run, such means comprising a slide having an arm which when the slide is stopped and held suspended interferes with and swings the pawl to inactive position, and a device under the control of the band for holding the slide suspended when a cord is to be run, as determined by the band, a second slide, a trigger or arm operatively connected therewith to coöperate with the wire after leaving the coiling device, and a connection between said slides whereby the second slide may be held suspended, together with the first slide.

149. In a coiled wire fabric machine, the combination, with the main frame, of an oscillating head therein, a coiling device, feed rolls for feeding the wire to the coiling device, and cut-off mechanism, said coiling device, feed rolls and cut-off mechanism being mounted on the oscillating head, and such mechanism being adjustable with respect to the coiling device.

150. In a coiled wire fabric machine, the combination, with the main frame, of an oscillating head therein, a coiling device, feed rolls for feeding the wire to the coiling device, and cut-off mechanism, said coiling device, feed rolls and cut-off mechanism being mounted on the oscillating head, a movable trigger or arm arranged to coöperate with the forward portion of the coil in the cording operation and also mounted on the oscillating head, said trigger being adjustable towards and away from the coiling device.

151. In a coiled wire fabric machine, the combination, with the main frame, of an oscillating head therein, a coiling device, feed rolls for feeding the wire to the coiling device, and cut-off mechanism, said coiling device, feed rolls and cut-off mechanism being mounted on the oscillating head, a movable trigger or arm arranged to coöperate with the forward portion of the coil in the cording operation and also mounted on the oscillating head, said trigger and cut-off mechanism being independently adjustable with respect to the coiling device.

152. In a coiled wire fabric machine, the combination, with the main frame, of an oscillating head therein, a coiling device, feed rolls for feeding the wire to the coiling device, and cut-off mechanism, said coiling device, feed rolls and cut-off mechanism being mounted on the oscillating head, a movable trigger or arm arranged to coöperate with the forward portion of the coil in the cording operation and also mounted on the oscillating head, a movable finger arranged rearwardly of the trigger to stretch the coil and position the cords and likewise mounted on the oscillating head, said finger being adjustable towards and away from the coiling device.

153. In a coiled wire fabric machine, the combination, with the main frame, of an oscillating head therein, a coiling device, feed rolls for feeding the wire to the coiling device, and cut-off mechanism, said coiling device, feed rolls and cut-off mechanism being mounted on the oscillating head, a movable trigger or arm arranged to coöperate with the forward portion of the coil in the cording operation and also mounted on the oscillating head, a movable finger arranged rearwardly of the trigger to stretch the coil and likewise mounted on the oscillating head, said finger, trigger and cut-off mechanism being independently adjustable towards and away from the coiling device.

154. In a coiled wire fabric machine, the combination, with the main frame, of an oscillating head carrying the coiling device, a housing on such head, a trigger frame mounted in the housing and having an independent movement, a trigger mounted in the trigger frame and arranged to coöperate with the forward end of the coil, and means for oscillating the head and moving the trigger frame.

155. In a coiled wire fabric machine, the combination, with the main frame, of an oscillating head carrying the coiling device, a housing on such head, a trigger frame mounted in the housing and having an independent movement, a trigger mounted in the trigger frame and arranged to coöperate with the forward end of the coil, a slide in the trigger frame, operating connections between the slide and the trigger, and means for oscillating the head.

156. In a coiled wire fabric machine, the combination, with the main frame, of an oscillating head carrying the coiling device, housing on such head, a trigger frame mounted in the housing and having an independent movement, a trigger mounted in the trigger frame and arranged to coöperate with the forward end of the coil, a slide in the trigger frame, operating connections between the slide and the trigger, cut-off mechanism carried by the head and also operated by the slide, and means for oscillating the head.

157. In a coiled wire fabric machine, the combination with the coiling device, and the weaving channel, of a rotatable roll arranged above the channel and adapted to elevate the completed fabric therefrom, said roll having a series of points or teeth to engage the fabric.

158. In a coiled wire fabric machine, the combination with the coiling device, and the weaving channel, of a rotatable roll arranged above the channel and adapted to elevate the completed fabric therefrom, and a friction device connection for the roll.

159. In a coiled wire fabric machine, the combination with the coiling device, and the weaving channel, of a rotatable roll arranged above the channel and adapted to elevate the completed fabric therefrom, and a friction drive connection for the roll, such friction being adjustable in degree.

160. In a coiled wire fabric machine, the combination with the coiling device, and the weaving channel, of a rotatable roll arranged above the channel and adapted to elevate the completed fabric therefrom, said roll having a spindle provided with a flange, a drive wheel fitting over the spindle, and a spring for pressing the drive wheel against the flange with a yielding pressure.

161. In a coiled wire fabric machine, the combination with the coiling device, and the weaving channel, of a rotatable roll arranged above the channel and adapted to elevate the completed fabric therefrom, said roll having a spindle, a flanged hub secured thereto, a drive wheel rotatable on the hub, and a spring for pressing the drive wheel against the flange of the hub with a yielding pressure.

162. In a coiled wire fabric machine, the combination with the coiling device, and the weaving channel, of a rotatable roll arranged above the channel and adapted to elevate the completed fabric therefrom, said roll having a spindle, a flanged hub secured thereto, a drive wheel rotatable on the hub, a spring for pressing the drive wheel against the flange of the hub with a yielding pressure, and a nut for regulating the tension of the spring.

163. In a coiled wire fabric machine, the combination, with the plurality of coiling devices and of weaving channels, of a corresponding series of rotatable rolls arranged above the channels respectively, and friction drive connections for said rolls operated from a common source.

164. In a coiled wire fabric machine, the combination, with a plurality of coiling devices, of weaving mechanisms comprising channels in which the wires as coiled are run, separate sets of shutters movable partially across the channels to coöperate with the coils, and operating connections for the shutters, the connections for one set of shutters of the different channels being separately yielding.

165. In a coiled wire fabric machine, the combination, with a plurality of coiling devices, of weaving mechanisms comprising channels in which the wires as coiled are run, separate sets of shutters movable partially across the channels to coöperate with the coils, and operating connections for the shutters, the connections for one set of shutters of the different channels being separately yielding, and the connections for the other set being yieldable in unison.

166. In a coiled wire fabric machine, the combination, with a plurality of coiling devices, of weaving mechanisms comprising channels in which the wires as coiled are run, separate sets of shutters movable partially across the channels to coöperate with the coils, and separate operating arms for the different sets of shutters, actuating or driving mechanism for said arms, separate yielding connections between the shutters of one set and their operating arm, and a yielding connection between the other arm and said driving mechanism.

167. In a coiled wire fabric machine, the combination, with a plurality of coiling devices, of weaving mechanisms comprising channels in which the wires as coiled are run, separate sets of shutters movable partially across the channels to coöperate with the coils, operating connections for the shutters, the connections for one set of shutters of the different channels being separately yielding, and means for independently adjusting the degree of such yielding.

168. In a coiled wire fabric machine, the combination, with a plurality of coiling devices, of weaving mechanisms comprising channels in which the wires as coiled are run, separate sets of shutters movable partially across the channels to coöperate with the coils, and separate operating arms for the different sets of shutters, actuating or driving mechanism for said arms, separate yielding connections between the shutters of one set and their operating arm, means for adjusting the degree of said yielding for the separate shutters of said set independently, and a yielding connection between the other arm and said driving mechanism.

169. In a coiled wire fabric machine, the combination with a plurality of coiling devices, of a corresponding plurality of weaving mechanism comprising channels in which the coiled wires are run and interwoven, retaining and ejecting shutters movable partially across their respective channels and arranged to coöperate with the coils, separately yieldable driving connections coöperating with the ejecting shutters, and driving connections coöperating with the retaining shutters and yieldable in unison.

170. In a coiled wire fabric machine, the combination, with the coiling device, of means for displacing the front end of the last coil to prevent interference with the next coil which is to be run as a cord, and means for maintaining the normal position of the first named coil as to its rearward end, the extreme forward end being displaced as described.

171. In a coiled wire fabric machine, the combination, with the coiling device, of means for displacing the front end of the last coil to prevent interference with the next coil which is to be run as a cord, and means for maintaining the normal position of the first named coil as to its rearward end, the extreme forward end being displaced as described, said last named means being also arranged to move the coil slightly rearwardly away from the coiling device.

172. In a coiled wire fabric machine, the combination, with the coiling device, of means for displacing the front end of the last coil to prevent interference with the next coil which is to be run as a cord, and a finger arranged to engage said first named coil a short distance from the front end thereof to prevent displacement of that coil except as to the front portion thereof.

173. In a coiled wire fabric machine, the combination, with the coiling device, of a trigger arranged to engage and position the coil last run to receive the next coil which is to be run as a cord, and a finger arranged rearwardly of the trigger and adapted to retain in its normal position that portion of the first named coil located rearwardly thereof when the trigger is operating to displace the forward end of that coil.

174. In a coiled wire fabric machine, the combination, with the coiling device, of a trigger arranged to engage and position the coil last run to receive the next coil which is to be run as a cord, and a finger arranged rearwardly of the trigger and adapted to retain in its normal position that portion of the first named coil located rearwardly thereof when the trigger is operating to displace the forward end of that coil and arranged to thereafter move that coil slightly rearwardly and to hold it against the cord-coil just run.

175. In a coiled wire fabric machine, the combination, with the coiling device, of a trigger arranged to engage and position the coil last run to receive the next coil which is to be run as a cord, and a vertically movable finger arranged to engage the first named coil a short distance from the front end thereof and to prevent displacement of that coil except as to the first position thereof and also arranged to thereafter move that coil slightly rearwardly and to hold it against the cord-coil just run.

176. In combination with a coiled wire fabric machine, wire reels, and means interposed between the machine and the wire reels for catching a knot or kink or the like in the wire, said means being held in a normal position against a tension tending to draw it away therefrom, and an electrically operated mechanism having a switch governed by said means.

177. In a coiled wire fabric machine, the combination therewith, of the wire reels, a pulley or sheave on which the wire runs from the reels to the machine and which is yieldingly held in a normal position and adapted to be moved vertically by the wire when caught or knotted, for the purpose of stopping the machine.

WILBER J. PINE.

Witnesses:
FRED GOEBEL,
GEO. R. BAILEY.